United States Patent Office 3,721,687
Patented Mar. 20, 1973

3,721,687
3-KETO-Δ⁴ - 9α - HALO - 11 - OXYGENATED-16-METHYL OR METHYLENE- 17α - ACYLOXY-20-KETO-21-HALO PREGNENES
Joseph Elks, London, Gordon Hanley Phillipps, Wembley, and Peter John May, North Harrow, England, assignors to Glaxo Laboratories Limited, Greenford, England
No Drawing. Continuation-in-part of application Ser. No. 792,809, Jan. 21, 1969. This application June 8, 1970, Ser. No. 44,565
Claims priority, application Great Britain, Apr. 4, 1968, 3,100/68
Int. Cl. C07c 160/30
U.S. Cl. 260—397.45            24 Claims

ABSTRACT OF THE DISCLOSURE

Anti-inflammatory steroids of the formula

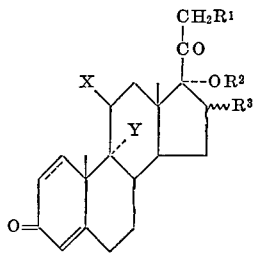

wherein $R^1$ is a fluorine, chlorine, bromine or iodine atom,
$R^2$ is an alkanoyl group containing 1–4 carbon atoms,
$R^3$ is an alkyl group containing 1–4 carbon atoms or a methylene group (=CH$_2$),
X is a hydroxy group in the β-configuration or a keto group,
Y is a fluorine or chlorine atom, and
= represents a single or double bond between the 1- and 2-positions of the molecule.

This application is a continuation-in-part of our co-pending application Ser. No. 792,809, filed on Jan. 21, 1969, and now abandoned.

This invention is concerned with novel anti-inflammatory steroids of the pregnane series.

Many compounds of the pregnane series are now well known in the treatment of inflamed conditions both internal and external. Compounds having particularly high anti-inflammatory action on topical administration have become of particular interest, the treatment of topical inflammations being an important part of dermatogolical practice. In the past it has been generally assumed that, in the body system, steroids possessing therapeutic anti-inflammatory activity necessarily possess actions on the intermediary metabolism, this action being termed "glucocorticoid action." In addition to glucocorticoid action, anti-inflammatory steroids also generally cause in the body system a disturbance of the mineral and liquid balance such action being termed "mineralo-corticoid" action.

In the use of steroids for internal anti-inflammatory action high anti-inflammatory action as compared with glucocorticoid action is very desirable since it thus becomes possible to treat inflammatory conditions with less likelihood of undesired side-effects such as disturbance of the intermediary metabolism. It may be noted that this is particularly important in the case of compounds for topical use, since such steroids are widely used in the treatment of local inflammation and it is well-known that absorption of the compound through the skin may take place with resultant undesired systemic action. The ratio of purely anti-inflammatory action to glucocorticoid action of an anti-inflammatory steroid is therefore of importance.

As a result in extensive researches we have found a novel class of steroid compounds having good anti-inflammatory action particularly on topical administration together with a generally good ratio of purely anti-inflammatory activity to other undesired glucocorticoid activity.

According to one feature of the present invention, there are provided compounds of the general formula

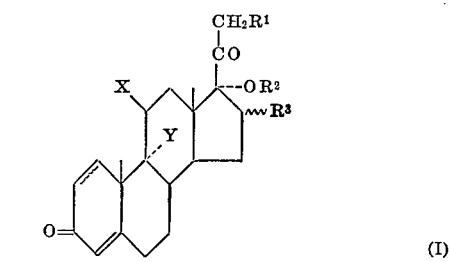

(I)

wherein $R^1$ is a fluorine, chlorine, bromine or iodine atom,
$R^2$ is an alkanoyl group containing 1–4 carbon atoms,
$R^3$ is an alkyl group containing 1–4 carbon atoms or a methylene group (=CH$_2$),
X is a hydroxy group in the β-configuration or a keto group,
Y is a fluorine or chlorine atom, and
= represents a single or double bond between the 1- and 2-positions of Formula I.

Compounds of Formula I which are generally preferred on account of their especially favourable topical anti-inflammatory activity and/or ratio of topical anti-inflammatory activity to glucocorticoid activity are those in which $R^2$ is an alkanoyl group containing at least 2 carbon atoms, and $R^3$ is a methyl group in the α- or β-configuration or a methylene group, the Δ$^{1,4}$ compounds of Formula I being especially preferred.

A class of particularly preferred compounds of Formula I having high topical anti-inflammatory activity are those compounds in which Y is a chlorine atom and $R^2$ is an alkanoyl group containing 2 or 3 carbon atoms, and wherein X is preferably a β-hydroxy group, and $R^3$ is preferably a methyl group in the β-configuration, those compounds in which $R^1$ represents a chlorine or bromine atom having especially good topical anti-inflammatory activity. Compounds of Formula I having a particularly favourable ratio of topical anti-inflammatory activity to glucocorticoid activity include those compounds in which Y is a chlorine atom and $R^2$ is an acetyl group especially such compounds in which $R^1$ represents a chlorine or bromine atom. In such compounds X is preferably a β-hydroxy group and $R^3$ is preferably a methyl group in the β-configuration.

A further class of particularly preferred compounds of Formula I having high topical anti-inflammatory activity are those compounds wherein Y is a fluorine atom and $R^2$ is an alkanoyl group containing 2–4 carbon atoms, preferably a straight chain alkanoyl group, and wherein X is preferably a β-hydroxy group and $R^3$ is preferably a methyl group in the β-configuration.

Compounds of Formula I having a particularly favourable ratio of topical anti-inflammatory activity to glucocorticoid activity include those compounds in which Y is a fluorine atom and $R^2$ is a butyryl or isobutyryl group when $R^1$ is a fluorine atom, or $R^2$ is a propionyl group when $R^1$ is an iodine atom. In such compounds X is preferably a β-hydroxy group and $R^3$ is preferably a methyl group in the β-configuration.

A further class of preferred compounds of Formula I having high topical anti-inflammatory activity and an especially favourable ratio of topical anti-inflammatory activity to glucocorticoid activity are those compounds in which $R^3$ is a methyl group in the $\alpha$-configuration and $R^2$ is an alkanoyl group containing at least 3 carbon atoms and especially such compounds in which $R^1$ is a chlorine or bromine atom. In such compounds Y is preferably a fluorine atom and X is preferably a $\beta$-hydroxy group.

A further class of preferred compounds of Formula I having high topical anti-inflammatory activity and a particularly favourable ratio of topical anti-inflammatory activity to glucocorticoid activity are those compounds wherein X is a keto group and $R^2$ is an alkanoyl group containing 2–4 carbon atoms, and wherein $R^3$ is preferably a methyl group, preferably in the $\beta$-configuration or a methylene group, $R^1$ is preferably fluorine or chlorine, and Y is preferably fluorine.

A further class of preferred compounds of Formula I having high topical anti-inflammatory activity are those in which $R^3$ is a methylene group and $R^2$ contains 2 to 4 carbon atoms and wherein X is preferably a $\beta$-hydroxy group, and Y is preferably a fluorine atom.

In general compounds in which the group $R^3$ is a methyl group in the $\beta$-configuration have higher anti-inflammatory action than the corresponding compounds in which it is a methyl group in the $\alpha$-configuration or a methylene group, and hence are preferred when a high level of topical anti-inflammatory activity is desired.

Quite generally compounds of Formula I in which $R^1$ is a fluorine, chlorine or bromine atom are preferred.

Compounds of Formula I in which Y is a fluorine atom are generally preferred where a high level of topical anti-inflammatory activity is desired.

A further feature of the invention comprises $9\alpha,21$-difluoro - $11\beta$ - hydroxy - $17\alpha$ - valeryloxy - $16\beta$ - methylpregna-1,4-diene-3,20-dione which has good topical anti-inflammatory activity and a good therapeutic ratio.

TABLE I $\Delta^{1,4}$ compounds

| Compound No. | $R^1$ | $R^2$ | $R^3$ | X | Y |
|---|---|---|---|---|---|
| 1 | F | CH₃CO— | β-CH₃ | βOH | F |
| 2 | Cl | CH₃CO— | β-CH₃ | βOH | F |
| 3 | Br | CH₃CO— | β-CH₃ | β-OH | F |
| 4 | I | CH₃CO— | β-CH₃ | β-OH | F |
| 5 | F | C₂H₅CO— | β-CH₃ | β-OH | F |
| 6 | Cl | C₂H₅CO— | β-CH₃ | β-OH | F |
| 7 | Br | C₂H₅CO— | β-CH₃ | β-OH | F |
| 8 | I | C₂H₅CO— | β-CH₃ | β-OH | F |
| 9 | F | n-C₃H₇CO— | β-CH₃ | β-OH | F |
| 10 | Cl | n-C₃H₇CO— | β-CH₃ | β-OH | F |
| 11 | F | iso-C₃H₇CO— | β-CH₃ | β-OH | F |
| 12 | Cl | iso-C₃H₇CO— | β-CH₃ | β-OH | F |
| 13 | F | n-C₄H₉CO— | β-CH₃ | β-OH | F |
| 14 | Cl | CH₃CO— | β-CH₃ | β-OH | Cl |
| 15 | Br | CH₃CO— | β-CH₃ | β-OH | Cl |
| 16 | Cl | C₂H₅CO— | β-CH₃ | β-OH | Cl |
| 17 | Br | C₂H₅CO— | β-CH₃ | β-OH | Cl |
| 18 | F | CH₃CO— | β-CH₃ | =O | F |
| 19 | Br | CH₃CO— | β-CH₃ | =O | F |
| 20 | Cl | C₂H₅CO— | β-CH₃ | =O | F |
| 21 | Br | C₂H₅CO— | β-CH₃ | =O | F |
| 22 | Cl | n-C₃H₇CO— | β-CH₃ | =O | F |
| 23 | Cl | CH₃CO— | α-CH₃ | β-OH | F |
| 24 | Cl | C₂H₅CO— | α-CH₃ | β-OH | F |
| 25 | Br | C₂H₅CO— | α-CH₃ | β-OH | F |
| 26 | I | C₂H₅CO— | α-CH₃ | β-OH | F |
| 27 | Cl | n-C₃H₇CO— | α-CH₃ | β-OH | F |
| 28 | Br | n-C₃H₇CO— | α-CH₃ | β-OH | F |
| 29 | Cl | iso-C₃H₇CO— | α-CH₃ | β-OH | F |
| 30 | Br | iso-C₃H₇CO— | α-CH₃ | β-OH | F |
| 31 | Cl | n-C₃H₇CO— | α-CH₃ | =O | F |
| 32 | F | CH₃CO— | =CH₂ | β-OH | F |
| 33 | Cl | CH₃CO— | =CH₂ | β-OH | F |
| 34 | Br | CH₃CO— | =CH₂ | β-OH | F |
| 35 | I | CH₃CO— | =CH₂ | β-OH | F |
| 36 | Cl | C₂H₅CO— | =CH₂ | β-OH | F |
| 37 | Br | C₂H₅CO— | =CH₂ | β-OH | F |
| 38 | F | C₂H₅CO— | =CH₂ | β-OH | F |
| 39 | F | C₂H₅CO— | =CH₂ | =O | F |
| 40 | F | n-C₃H₇CO— | =CH₂ | β-OH | F |
| 41 | Cl | n-C₃H₇CO— | =CH₂ | β-OH | F |
| 42 | Br | n-C₃H₇CO— | =CH₂ | β-OH | F |
| 43 | I | n-C₃H₇CO— | =CH₂ | β-OH | F |
| 44 | F | iso-C₃H₇CO— | =CH₂ | β-OH | F |
| 45 | Cl | iso-C₃H₇CO— | =CH₂ | β-OH | F |
| 46 | Br | iso-C₃H₇CO— | =CH₂ | β-OH | F |
| 47 | I | iso-C₃H₇CO— | =CH₂ | β-OH | F |
| 48 | F | n-C₃H₇CO— | =CH₂ | =O | F |
| $\Delta^4$ compounds | | | | | |
| 49 | Cl | C₂H₅CO— | β-CH₃ | β-OH | F |
| 50 | Br | C₂H₅CO— | β-CH₃ | β-OH | F |

Compounds according to the invention having particularly high anti-inflammatory activity are exemplified by compounds of Formula I above in which the groups $R^1$, $R^2$, $R^3$, X and Y have the values stated in Table I above for compounds Nos. 1–20, 22–45 and 47–50.

Those compounds set out in the foregoing Table I which possess a particularly favourable therapeutic ratio are Nos. 3, 5–11, 13, 14, 15, 17–24, 27, 29, 33, 35–37, 39, 41, 43, 46, and 47.

In addition, we have found that Compound No. 38 in the foregoing Table I, namely $9\alpha,21$ - difluoro - $11\beta$ - hydroxy - 16 - methylene - 17 - propionyloxypregna-1,4-diene-3,20-dione, has an anti-inflammatory activity on topical application of an extremely high order, and indeed an activity as high as any of the many anti-inflammatory steroids of the pregnane series which we have heretofore tested. The glucocorticoid activity of this compound as judged by its thymolytic action in the mouse is comparatively low with the result that its ratio of topical anti-inflammatory activity to systemic activity is particularly favourable.

Furthermore, we have also found that Compound No. 39 in the foregoing Table I namely $9\alpha,21$ - difluoro - 16-methylene - 17 - propionyloxypregna - 1,4 - diene - 3,11, 20-trione, has a high topical anti-inflammatory activity and a very favourable ratio of topical anti-inflammatory activity to glucocorticoid activity.

According to a further feature of the invention we provide pharmaceutical compositions for use in anti-inflammatory therapy, comprising at least one steroid compound of Formula I (as hereinbefore defined) together with one or more pharmaceutical carriers or excipients. Such compositions may be in forms adapted for topical or internal administration.

The active steroid may be formulated into a preparation suitable for topical administration with the aid of a topical vehicle therefor. Examples of various types of preparation for topical administration, include ointments, lotions, creams, powders, drops (e.g. eye or ear drops), sprays (e.g. for the nose or throat), suppositories, retention enemas, chewable or suckable tablets or pellets (e.g. for the treatment of aphthous ulcers) and aerosols. Ointments and creams may for example, be formulated with an aqueous or oily base with the addition of suitable thickening and/or gelling agents. Such base may thus, for example, include water and/or an oil such as liquid paraffin or a vegetable oil such as arachis oil or castor oil. Thickening agents which may be used according to the nature of the base include soft paraffin, aluminium stearate, cetostearyl alcohol, polyethylene glycols, woolfat, hydrogenated lanolin and beeswax.

Lotions may be formulated with an aqueous or oily base and will in general also include one or more of the following namely, emulsifying agents, dispersing agents, suspending agents, thickening agents, colouring agents and perfumes.

Powders may be formed with the aid of any suitable powder base e.g. talc, lactose or starch. Drops may be formulated with an aqueous base also comprising one or more dispersing agents, suspending agents or solubilising agents etc.

Spray compositions may for example be formulated as aerosols with the use of a suitable propellant, e.g. dichlorodifluoromethane or trichlorofluoromethane.

The proportion of active steroid in the topical compositions according to the invention depends on the precise type of formulations to be prepared but will generally be within the range of from 0.0001% to 5% by weight. Generally however for most types of preparations advantageously the proportion used will be within the range of from 0.001–0.5% and preferably 0.01 to 0.25%.

Topical preparations may be administered by one or more applications per day to the effected area; over skin areas occlusive dressings may often be used with advantage.

For internal administration the new compounds according to the invention may, for example, be formulated for oral, parenteral or rectal administration. For oral administration, syrups, elixirs, powders and granules may be used which may be formulated in conventional manner. Dosage unit forms are however preferred as described below.

For parenteral administration the compounds may be presented in sterile aqueous or oily vehicles, suitable oily vehicles including arachis oil, olive oil etc.

Preferred forms of preparation for internal administration are dosage unit forms i.e. presentations in unitary form in which each unit contains a desired dose of the active steroid. Such dosage unit forms may contain from 0.05 to 2.0 mg. preferably from 0.25 to 1.0 mg. of the active steroid. For oral administration suitable dosage unit forms include tablets, coated tablets and capsules. For parenteral administration dosage unit forms include sealed ampoules or vials each containing a desired dose of the steroid. Suppositories, which may be prepared for example with conventional commercial suppository bases, provide a dosage unit form for rectal administration. Sterile tablet or pellet implants may also be used, e.g. where slow systemic absorption is desired.

The compounds according to the invention may in general be given by internal administration in cases where systemic adreno-cortical therapy is indicated.

In general terms preparations for internal administration may contain from 0.01 to 5.0% of active ingredient dependent on the type of preparation involved. The daily dose may vary from 0.05 to 10.0 mg. dependent on the condition being treated and the duration of treatment desired.

The compositions according to the invention may also include one or more preservatives or bacteriostatic agents e.g. methyl hydroxy benzoate, propyl hydroxy benzoate, chlorocresol or benzalkonium chlorides. The compositions according to the invention may also contain other active ingredients such as antimicrobial agents, particularly antibiotics, such as neomycin.

According to a further feature of the invention there is provided a process for the preparation of the compounds of Formula I (as hereinbefore defined) in which a compound of formula

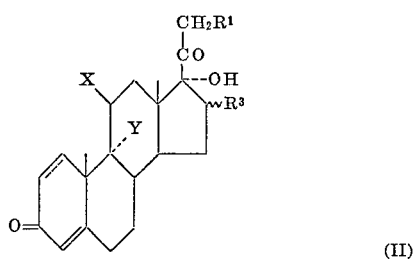

(II)

(wherein $R^1$, $R^3$, X and Y are as hereinbefore defined) is acylated to introduce the desired alkanoyl group at position 17.

The acylation may be carried out by treating the parent 17-hydroxy compound with the appropriate acid anhydride or acid chloride, if desired in the presence of a non-hydroxylic solvent and in the presence of a strong acid catalyst. The non-hydroxylic solvent may for example be chloroform, methylene chloride or benzene and the strong acid catalyst may for example be perchloric acid, toluene-p-sulphonic acid or a strongly acidic cation exchange resin e.g. Amberlite (registered trademark) IR 120. The optimum reaction conditions, particularly of acid concentration and reaction time, should be determined by pilot experiments using thin layer chromatography.

In a further method of acylation the parent 17α-hydroxy compound may be reacted with the appropriate aliphatic acid in the presence of trifluoroacetic anhydride.

Compounds of Formula I in which X is a keto group can for example be prepared by acylation of a compound of Formula II in which X is a keto group. Such 11-keto compounds may, for example, be prepared by oxidation of the corresponding 11β-hydroxy compounds, conveniently with chromic acid, conveniently in an inert solvent e.g. aqueous acetone, preferably in the presence of sulphuric acid, and subsequently acylating the 17-position as described above. Alternatively a compound of Formula I in which X is a hydroxy group may be prepared and subsequently oxidised.

The acylation of compounds of Formula II is particularly convenient for the preparation of compounds of Formula I in which $R^1$ is fluorine.

According to a still further feature of the present invention there is provided an alternative process for the preparation of compounds of Formula I (as hereinbefore defined) which comprises reacting in an inert polar medium a compound of formula

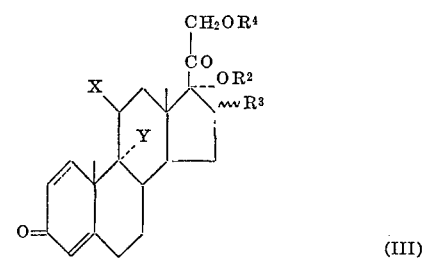

(III)

(in which $R^2$, $R^3$, X and Y are as hereinbefore defined and $R^4$ is an organo-sulphonyl group) with a compound furnishing halide ions (the halide ions being those of the halogen $R^1$). This method is particularly convenient for the preparation of compounds in which $R^1$ is chlorine, bromine or iodine.

The compound furnishing halide ions may for example be a salt of an alkali metal e.g. a lithium, sodium or potassium halide, a halide of an alkaline earth metal e.g. a magnesium or calcium halide, a tertiary ammonium halide, e.g. a lower trialkylamine hydrohalide e.g. a triethylamine hydrohalide, a pyridine hydrohalide, a dimethylaniline hydrohalide, a quaternary ammonium halide, such as a tetra lower alkyl ammonium halide e.g. a tetraethyl ammonium halide, or a lower alkyl pyridinium halide. The polar medium should preferably be non-hydroxylic, suitable polar media being for example lower aliphatic ketones such as acetone, methyl ethyl ketone etc. amide solvents e.g. lower dialkylamides, e.g. dimethylformamide, dimethyl acetamide etc., hexamethyl phosphoramide or mixtures thereof.

The reaction may be conveniently carried out at temperatures between 40 and 170° C. advantageously at the boiling point of the reaction medium. The reaction is slow and the larger the halogen atom, the longer is the reaction time required.

The production of 21-chloro compounds for example may require a reaction time of 1–3 days while the production of 21-iodo compounds may require as much as 13–14 days or more. The reaction may be followed by conventional methods e.g. by sampling the reaction mixture from time to time and examining the samples by thin layer chromatography.

In the production of compounds in which $R^1$ is iodine it may be convenient first to form the corresponding 21-bromide and then exchange the bromine atom for an iodine atom by reaction with a compound furnishing iodide ions in a polar medium under the general conditions described above for reaction with the 21-sulphonates.

Again for the production of compounds in which X is a keto group one may start from the corresponding 11-hydroxy compounds of Formula III and oxidise the 11-hydroxy group before or after the conversion of the group $OR^4$ to a halogen atom by the method described above.

In compounds of Formula III the group $R^4$ may be an alkyl, aryl, or aralkyl sulphonyl group, e.g. a methane sulphonyl, benzene sulphonyl, p-toluenesulphonyl or p-bromobenzenesulphonyl group. Compounds of Formula III may be prepared in conventional manner from the corresponding 21-hydroxy compounds by sulphonylation e.g. by reaction with the appropriate organosulphonyl halide e.g. the chloride, in the presence of an acid acceptor such as a tertiary amine, e.g. pyridine, triethylamine, N-methylmorpholine, dimethylaniline etc.

Starting materials of Formula II may be prepared from the corresponding 21-hydroxy compounds by generally known methods, e.g. by the methods described above for the conversion of compounds of Formula III to compounds of Formula I.

For the better understanding of the invention the following examples are given by way of illustration only:

EXAMPLE 1

9α - fluoro - 11β-hydroxy-21-methanesulphonyloxy-16β-methyl - 17 - propionyloxypregna - 1,4 - diene-3,20-dione Betamethasone 17-propionate (5.3 g.) was dissolved in pyridine (20 ml.), methanesulphonyl chloride (5 ml.) was added and the solution was allowed to stand at room temperature for 15 minutes, by which time the reaction, as judged by thin layer chromatography, was complete. The solution was then poured into dilute ice-cold hydrochloric acid with stirring and the solid was filtered off and crystallized from aqueous ethanol to yield the title compound (4.5 g.) M.P. 177–179° C. $[\alpha]_D$ +80° (c. 0.5 in $CHCl_3$), $\lambda_{max}$. 238–240 nm. ($\epsilon$ 15,800) (Found: C, 58.2; H, 7.0. $C_{26}H_{35}FO_8S$. 0.5 $H_2O$ requires C, 58.2; H, 6.8%).

Following the general procedure of Example 1 the compounds detailed below in Examples 2–11 were prepared. The starting material in each example was the 21-alcohol corresponding to the 21-methane sulphonate. Purification methods and other details where substantially different from those described in Example 1, are given in each example.

EXAMPLE 2

17-acetoxy-9α-fluoro-11β-hydroxy-21-methanephenyloxy-16β-methylpregna-1,4-diene-3,20-dione Crystallized from methanol M.P. 199.5–200.5° C. (Kofler), $[\alpha]_D$ + 77.5° (c. 1.14 dioxan), $\lambda_{max}$. 237 nm. ($\epsilon$ 16,500) (Found: C, 59.0; H, 6.5; S, 6.3. $C_{25}H_{33}FO_8S$ requires C, 58.6; H, 6.5; S, 6.3%).

EXAMPLE 3

17-butyryloxy-9α-fluoro - 11β - hydroxy-21-methanesulphonyloxy-16β-methylpregna-1,4-diene-3,20-dione The product was purified by dilution of a methanolic solution with water giving an amorphous solid M.P. 112–117° C. (Kofler), $[\alpha]_D$ +73.2° (c. 1.1, dioxan), $\lambda_{max}$. 238 nm. ($\epsilon$ 14,700) (Found: S, 6.0. $C_{27}H_{37}FO_8S$ requires S, 5.9%).

EXAMPLE 4

9α-fluoro-11β-hydroxy-17-isobutyryloxy-21-methanesulphonyloxy-16β-methylpregna-1,4-diene-3,20-dione The compound on precipitation with ice-cold dilute hydrochloric acid had $\gamma_{max}$. (in Nujol) 3350, 1730, 1668, 1180 and 886 cm.$^{-1}$.

EXAMPLE 5

9α-fluoro-11β-hydroxy-21-methanesulphonyloxy-16α-methyl-17-propionyloxypregna-1,4-diene-3,20-dione The reaction mixture resulting from the sulphonylation reaction was diluted with water to give the title compound as an amorphous solid having $\gamma_{max}$. (in bromoform) 1730, 1670, 1630 and 1360 cm.$^{-1}$.

EXAMPLE 6

9α-fluoro-11β-hydroxy-21-methanesulphonyloxy-16-methylene-17-propionyloxypregna-1,4-diene-3,20-dione The sulphonylation reaction was carried out at 0° C. for 1 hour the mixture diluted with water and extracted with ethyl acetate and the title compound recovered by evaporation of the solvent.

EXAMPLE 7

9α-chloro-11β-hydroxy-21-methanesulphonyloxy-16β-methyl-17-propionyloxypregna-1,4-diene-3,20-dione The crude amorphous product obtained by precipitation from the reaction solution was purified by preparative thin layer chromatography and crystallization from acetone-petroleum ether to yield the title compound M.P. 186° $[\alpha]_D$ +100.8° (c. 1.0 dioxan) (Found: C, 57.0; H, 6.4; Cl, 6.8; S, 5.8. $C_{26}H_{35}ClO_8S$ requires C, 57.5; H, 6.5; Cl, 6.5, S, 5.9%).

EXAMPLE 8

17-acetoxy-9α-chloro-11β-hydroxy-21-methanesulphonyloxy-16β-methylpregna-1,4-diene-3,20-dione The sulphonylation reaction was conducted for 30 minutes at 0° C., the reaction mixture was poured into iced 2 N-hydrochloric acid and filtered to give the title compound (97% yield).

The starting material for this example (17α-acetoxy-9α - chloro-11β,21-dihydroxy - 16β - methylpregna-1,4-diene-3,20-dione) was prepared from the corresponding 17α,21-diol via the ethylortho-acetate and hydrolysis of the latter with aqueous acetic acid (cf. British Pat. No 1,047,518). It had M.P. 178–180° C. (dec.), $[\alpha]_D$ +118.5 (c., 1.4 in dioxan), $\lambda_{max}$. (EtOH) 238 m$\mu$. ($\epsilon$=15,640).

EXAMPLE 9

17-butyryloxy-9α-fluoro-11β-hydroxy-21-methanesulphonyloxy-16α-methylpregna-1,4-diene-3,20-dione The sulphonylation reaction was conducted for 30 minutes at 0° C., the reaction mixture poured into ice-cold 2 N-hydrochloric acid and the buff coloured amorphous title compound was removed by filtration and washed thoroughly with water. It had $\lambda_{max}$. 238 nm. ($\epsilon$ 15,500), $\gamma_{max}$. (in Nujol) 3505, 1721, 1677, 1182 and 888 cm.$^{-1}$.

EXAMPLE 10

9α-fluoro-11β-hydroxy-17-isobutyryloxy-21-methanesulphonyloxy-16α-methylpregna-1,4-diene-3,20-dione The sulphonylation reaction was conducted for 30 minutes at 0° C., the solution poured into 2 N-hydrochloric acid to give a cream coloured precipitate of amorphous title compound $\lambda_{max}$. 238 nm. ($\epsilon$ 16,000). $\gamma_{max}$. (in bromoform) 3633, 1730, 1658, 1625, 1355 and 888 cm.$^{-1}$.

EXAMPLE 11

17-acetoxy-9α-fluoro-11β-hydroxy-21-methanesulphonyl-16-methylenepregna-1,4-diene-3,20-dione The sulphonylation reaction was carried out at 0° C. for 1.25 hours, the reaction mixture poured into water containing 2 N-sulphuric acid. The precipitated material was extracted with ethyl acetate washed with water, dried ($MgSO_4$) and evaporated to give title compound as a foam.

EXAMPLE 12

17-butyryloxy-9α-fluoro-21-methaanesulphonyloxy-16β-methylpregna-1,4-diene-3,11,20-trione A solution of 17-butyryloxy-9α-fluoro-11β-hydroxy-21-methanesulphonyloxy - 16β - methylpregna - 1,4 - diene-3,20-dione (1.87 g.) in acetone (55 ml.) was cooled in an ice bath and treated dropwise with stirring with a solution of chromic acid (1.4 ml.) prepared from chromium trioxide (66.7 g.) in water (250 ml.) containing concentrated sulphuric acid (53.3 ml.). The mixture was kept cold for 1.25 hours and then kept at room temperature for a further 1.25 hours. Ether (150 ml.) and ethyl acetate (150 ml.) were added and the organic solution washed thoroughly with water, dried over magnesium sulphate and the solvent removed in vacuo. Recrystallization of the residue from acetone-petroleum ether afforded the title compound (1.25 g.) M.P. 98–100. $[\alpha]_D$ +96.3° (c. 0.99, dioxan), $\lambda_{max.}$ 234 nm. ($\epsilon$ 16,100) (Found: C, 60.3; H, 5.95; S, 6.0. $C_{27}H_{35}FO_8S$ requires C, 60.2; H, 6.5; S, 6.0%).

The reaction times and the analytical data of the compounds described in the following Examples 13–38, 40, 41, 47–54, 57–60, 63–65, 68–78, and 81–82 are contained in Table II hereinafter.

EXAMPLE 13

17-acetoxy-21-chloro-9α-fluoro-11β-hydroxy-16β-methylpregna-1,4-diene-3,20 dione Betamethasone 17-acetate 21-methanesulphonate (1.0 g.) in a mixture of acetone (40 ml.) and dimethylformamide (25 ml.) was treated with dry lithium chloride (2 g.) and the mixture refluxed for three days. Dilution with water after about half of the solvent had been evaporated in vacuo gave the crude product which was purified by filtration through magnesium trisilicate in benzene-ethyl acetate (3:1) and two crystallizations from ethyl acetate-petroleum ether.

Further 21-chloro compounds were prepared following the general method of Example 13, which compounds are detailed below as Examples 14–19. The starting material in each example was the 21-methane sulphonate corresponding to the 21-chloro compound.

Purification methods and other details where substantially different from those described in Example 13 are detailed under each example.

EXAMPLE 14

21-chloro-9α-fluoro-11β-hydroxy-16β-methyl-17-propionyloxypregna-1,4-diene-3,20-dione

EXAMPLE 15

17-butyryloxy-21-chloro-9α-fluoro-11β-hydroxy-16β-methylpregna-1,4-diene-3,20-dione

EXAMPLE 16

21-chloro-9α-fluoro-11β-hydroxy-17-isobutyryloxy-16β-methylpregna-1,4-diene-3,20-dione

EXAMPLE 17

9α,21-dichloro-11β-hydroxy-16β-methyl-17-propionyloxypregna-1,4-diene-3,20-dione The crude product was recrystallized from ethyl acetate.

EXAMPLE 18

17-acetoxy-9α,21-dichloro-11β-hydroxy-16β-methylpregna-1,4-diene-3,20-dione

The crude product was purified by preparative thin layer chromatography, filtration through neutral alumina and crystallization from acetone-petroleum ether.

EXAMPLE 19

17-butyryloxy-21-chloro-9α-fluoro-11β-hydroxy-16α-methylpregna-1,4-diene-3,20-dione The crude product was filtered through magnesium trisilicate in benzene-ethyl acetate (2:1) to remove colour and then crystallised from acetone-petroleum ether.

EXAMPLE 20

21-chloro-9α-fluoro-11β-hydroxy-16α-methyl-17-propionyloxypregna-1,4-diene-3,20-dione A mixture of 9α-fluoro-11β-hydroxy-21-methanesulphonyloxy-16α-methyl - 17 - propionyloxypregna-1,4-diene-3,20-dione (604 mg.) and lithium chloride (1.2 g.) in acetone (25 ml.) and dimethylformamide (12 ml.) was refluxed for 4 days. The solvent was then removed in vacuo, ethyl methyl ketone (100 ml.) added and the mixture refluxed for a further 4 days. Most of the solvent was removed in vacuo, water was added to the residue and the crude product extracted into ether. Purification by filtration through neutral alumina in chloroform and recrystallization from ethanol yielded the title compound (228 mg.).

EXAMPLE 21

21-chloro-9α-fluoro-11β-hydroxy-17-isobutyryloxy-16α-methylpregna-1,4-diene-3,20-dione A mixture of 9α-fluoro-11β-hydroxy-17-isobutyryloxy-21-methanesulphonyloxy - 16α - methylpregna-1,4-diene-3,20-dione (1.20 g.) and lithium chloride (2.4 g.) in methyl ethyl ketone (60 ml.) was refluxed for 3 days. The solvent was then evaporated in vacuo and replaced by acetone (45 ml.) and dimethylformamide (25 ml.) and the mixture refluxed for a further 7 days. Most of the solvent was evaporated in vacuo and the residue diluted with water to afford a coloured solid which was removed by filtration. This solid was filtered through magnesium trisilicate in benzene-ethyl acetate (2:1) and then crystallised from acetone-petroleum ether to afford the desired product as fine needles.

EXAMPLE 22

21-chloro-9α-fluoro-11β-hydroxy-16-methylene-17-propionyloxypregna-1,4-diene-3,20-dione A mixture of 9α-fluoro-11β-hydroxy-21-methanesulphonyloxy-16-methylene - 17 - propionyloxypregna-1,4-diene-3,20-dione (200 mg.) lithium chloride (5 g.) and acetone (50 ml.) was refluxed for 3 days. Dilution with water afforded a solid which was recrystallized from methanol to give the title compound (45 mg.).

EXAMPLE 23

17-acetoxy-21-chloro-9α-fluoro-11β-hydroxy-16-methylenepregna-1,4-diene-3,20-dione 17-acetoxy - 9α - fluoro - 11β-hydroxy-21-methanesulphonyloxy-16 - methylenepregna - 1,4 - diene-3,20-dione (286 mg.) in acetone (50 ml.) was treated with lithium chloride (916 mg.) and the mixture refluxed 11 days. Evaporation of the solvent and addition of water gave a semi-solid which was extracted into ethyl acetate. The extract was washed with water, treated with charcoal and then dried (MgSO₄) and evaporated. Crystallisation of the residue gave the title compound.

EXAMPLE 24

(a) 9α-fluoro-21-methanesulphonyloxy-16β-methyl-17-propionyloxypregna-1,4-diene-3,11,20-trione A solution of chromic acid (0.73 ml.) prepared from chromium trioxide (66.7 g.) in water (250 ml.) containing concentrated sulphuric acid (53.3 ml.) was added dropwise to a stirred solution of 9α-fluoro-21-methanesulphonyloxy - 16β - methyl-17-propionyloxypregna-1,4-diene-3,20-dione (1 g.) in acetone (30 ml.) at 0° C. The mixture was kept at 0° C. for 1.25 hours and then allowed to come to room temperature. After a total time of 3 hours the mixture was diluted with ether and ethyl acetate and the organic layer washed well with water. Evaporation of the solvent in vacuo and crystallization of the residue from acetone-petroleum ether afforded the title compound (693 mg.) M.P. 212–214° C.
$[\alpha]_D$+100.9 (c. 1.04, dioxan), $\lambda_{max.}$ 234 nm. ($\epsilon$ 15,800). (Found: C, 59.25; H, 6.5; S, 6.1. $C_{26}H_{33}FO_8S$ requires C, 59.5; H, 6.3; S, 6.1%).

(b) 21-chloro-9α-fluoro-16β-methyl-17-propionyloxypregna-1,4-diene-3,11,20-trione A solution of 9α-fluoro-21-methanesulphonyloxy-16β-methyl - 17 - propionyloxypregna-1,4-diene-3,11,20-trione (502 mg.) in ethyl ketone (25 ml.) was treated with lithium chloride (1 g.) and the mixture refluxed for four days. About half of the solvent was evaporated in vacuo and the residue diluted with water to afford a buff coloured precipitate. Filtration of this solid in benzene-ethyl acetate (3:1) through magnesium trisilicate and crystallization from acetone-petrol gave the title compounds. (217 mg.).

EXAMPLE 25

17-butyryloxy-21-chloro-9α-fluoro-16β-methylpregna-1,4-diene-3,11,20-trione 17-butyryloxy - 9α - fluoro-21-methanesulphonyloxy-16β-methylpregna-1,4-diene-3,11,20-trione (505 mg.) in ethylmethyl ketone (25 ml.) was treated with lithium chloride (1 g.) and the mixture refluxed for 2.5 days. About half of the solvent was removed in vacuo and the residue diluted with water and extracted with ether. Evaporation of the ethereal extract and purification of the crude product by filtration through magnesium trisilicate and preparative thin layer chromatography afforded a solid (333 mg.) which crystallized from methanol to afford the title compound.

EXAMPLE 26

17-acetoxy-21-bromo-9α-fluoro-11β-hydroxy-16β-methylpregna-1,4-diene-3,20-dione

Betamethasone 17-acetate 21-methanesulphonate (1.0 g.) was dissolved in a mixture of acetone (40 ml.) and dimethylformamide (25 ml.) and treated with dry lithium bromide (2.0 g.). After the mixture had been refluxed for three days about half of the solvent was removed in vacuo and the residue poured into water. The precipitated product was dried and filtered through magnesium trisilicate in ethyl acetate-benzene (1:3) and crystallized twice from ethyl acetate-petroleum ether to afford the title compounds.

Further 21-bromo compounds were prepared according to the general method of Example 26, which compounds are detailed below as Examples 27–31. The starting material in each example was the 21-methane sulphonate corresponding to the 21-bromo compound.

Purification methods and other details where substantially different from those described in Example 26 are detailed under each example.

EXAMPLE 27

21-bromo-9α-fluoro-11β-hydroxy-16β-methyl-17-propionyloxypregna-1,4-diene-3,20-dione The crude bromo compound was filtered through a short column of magnesium trisilicate in ethyl acetate-benzene (2:7) and the product was crystallized from aqueous methanol.

EXAMPLE 28

21-bromo-17-butyryloxy-9α-fluoro-11β-hydroxy-16β-methylpregna-1,4-diene-3,20-dione The product was crystallised from aqueous methanol and then ethyl acetate-petroleum ether.

EXAMPLE 29

21-bromo-9α-fluoro-11β-hydroxy-17-isobutyryloxy-16β-methylpregna-1,4-diene-3,20-dione

EXAMPLE 30

17-acetoxy-21-bromo-9α-chloro-11β-hydroxy-16β-methylpregna-1,4-diene-3,20-dione

The product was crystallised from acetone-petroleum ether.

EXAMPLE 31

21-bromo-17-butyryloxy-9α-fluoro-11β-hydroxy-16α-methylpregna-1,4-diene-3,20-dione The crude product is benzene-ethyl acetate (2:1) filtered through magnesium trisilicate to remove colour and then crystallised from acetone-petroleum ether to afford the title compound.

EXAMPLE 32

21-bromo-9α-fluoro-11β-hydroxy-17-isobutyryloxy-16α-methylpregna-1,4-diene-3,20-dione A mixture of 9α-fluoro-11β-hydroxy-17-isobutyryloxy-21-methanesulphonyloxy - 16α - methylpregna-1,4-diene-3,20-dione (1.21 g.) and lithium bromide (2.41 g.) in ethyl methyl ketone (60 ml.) was refluxed for 2 days. About half of the solvent was evaporated in vacuo and the residue diluted with water to give a dark oily product which was extracted into ethyl acetate. The washed and dried extract was evaporated in vacuo and the residue purified by filtration through magnesium trisilicate in benzene-ethyl acetate (2:1) and crystallisation from acetone-petroleum ether to afford the title compound.

EXAMPLE 33

21-bromo-9α-fluoro-11β-hydroxy-16α-methyl-17-propionyloxypregna-1,4-diene-3,20-dione A solution of 9α - fluoro-11β-hydroxy-21-methanesulphonyloxy - 16α-methyl-17-propionyloxypregna-1,4-diene-3,20-dione (603 mg.) in methyl ethyl ketone (25 ml.) and dimethylformamide (12 ml.) was treated with lithium bromide (1.2 g.) and the mixture refluxed for 18 hours. About half of the solvent was evaporated in vacuo and water added to give the crude product (510 mg.) which was purified, by filtration through neutral alumina in chloroform and crystallization from ethanol to give the title compound (309 mg.).

EXAMPLE 34

21-bromo-9α-fluoro-11β-hydroxy-16-methylene-17-propionyloxypregna-1,4-diene-3,20-dione A solution of 9α - fluoro - 11β-hydroxy-21-methanesulphonyloxy - 16 - methylene - 17-propionyloxypregna-1,4-diene - 3,20 - dione (150 mg.) in acetone (50 ml.) was treated with lithium bromide (6 g.) under reflux for 3 days. Dilution with water afforded a solid which on crystallization from methanol gave the title compound (50 mg.).

EXAMPLE 35

17-acetoxy-21-bromo-9α-fluoro-11β-hydroxy-16-methylenepregna-1,4-diene-3,20-dione 17 - acetoxy - 9α - fluoro-11β-hydroxy-21-methanesulphonyloxy-16-methylenepregna-1,4-diene-3,20-dione (400 mg.) and lithium bromide (2.01 g.) were refluxed in acetone (75 ml.) for 23 hours. The mixture was concentrated in vacuo and diluted with water to afford a solid which on crystallisation from acetone-petroleum ether and then methanol gave the title compound.

EXAMPLE 36

9α-fluoro-11β-hydroxy-21-iodo-16β-methyl-17-propionyloxypregna-1,4-diene-3,20-dione Betamethasone 21 - methane-sulphonate 17-propionate (1.0 g.) in acetone (40 ml.) and dimethylformamide (25 ml.) containing potassium iodide (2.0 g.) was refluxed for 6 days. Dilution of the reaction mixture gave the crude product which was purified by preparative thin layer chromatography over silica gel and crystallization from ethyl acetate-petroleum ether to afford the title compound.

EXAMPLE 37

17-butyryloxy-9α-fluoro-11β-hydroxy-21-iodo-16β-methylpregna-1,4-diene-3,20-dione A solution of betamethasone 17-butyrate 21-methane-sulphonate (1.0 g.) in acetone (40 ml.) containing potassium iodide (2.0 g.) was refluxed for 13 days. About half of the solvent was evaporated and the mixture diluted with water to give the crude iodo-compound which was

EXAMPLE 38

9α,21-difluoro-11β-17-dihydroxy-16β-methylpregna-1,4-diene-3,20-dione

A solution of 9α-fluoro-11β-17-dihydroxy-21-iodo-16β-methylpregna-1,4-diene-3,20-dione (10 g.) in acetonitrile (50 ml.) containing 50% aqueous silver fluoride solution (10 ml.) was warmed to 50° C. for two hours. The reaction mixture was diluted with water and extracted with ethyl acetate. Evaporation of the organic layer afforded a crude product which was extracted with benzene. Evaporation of the benzene gave a solid which was triturated with chloroform-acetone (8:1) to afford crude 21-desoxy 21 - fluorobetamethasone. Three crystallizations from chloroform afforded the title compound (450 mg.).

EXAMPLE 39

9α,21-difluoro-11β-hydroxy-16β-methyl-17-propionyloxy-pregna-1,4-diene-3,20-dione A suspension of 9α,21-difluoro-11β,17-dihydroxy-16β-methylpregna-1,4-diene-3,20-dione (168 mg.) in methylene chloride (17 ml.) containing propionic anhydride (1.7 ml.) and toluene p-sulphonic acid (179 mg.) was stirred at room temperature for five days. The resulting solution was diluted with more methylene chloride and washed with dilute sodium bicarbonate solution and water. After evaporation of the solvent the residue was dissolved in ethanol, sodium bicarbonate solution added and the mixture stirred for 30 minutes at room temperature. Dilution with water and extraction of the precipitated material with methylene chloride afforded the crude product as a solid after trituration with petroleum ether. This material was purified by preparative thin layer chromatography over silica gel and crystallization from acetone-petroleum ether to yield the title compound M.P. 220–224° (Kofler).

$\gamma_{max}$. (in CHBr$_3$) 3590, 1728, 1660 and 1622 cm.$^{-1}$, $\tau$ 5.33 (doublet, J=47 C./sec.; CH$_2$-F) 8.43 (19-Me), 8.64 (16-Me), 8.97 (18-Me).

EXAMPLE 40

9α,21-difluoro-11β-hydroxy-17-isobutyryloxy-16β-methylpregna-1,4-diene-3,20-dione Following the method of Example 39 but using isobutyric anhydride in place of propionic anhydride, the title compound was prepared. The product was crystallised from aqueous acetone.

EXAMPLE 41

17-butyryloxy-9α,21-difluoro-11β-hydroxy-16β-methylpregna-1,4-diene-3,20-dione

A suspension of 9α,21-difluoro-11β,17-dihydroxy-16β-methylpregna-1,4-diene-3,20-dione (300 mg.) in methylene chloride (33 ml.) and butyric anhydride (3 ml.) containing toluene p-sulphonic acid (310 mg.) was stirred at room temperature for 4 days. The solvent was removed in vacuo and the oily residue dissolved in ethanol and treated with saturated sodium bicarbonate solution. After stirring vigorously for 30 minutes more water was added and the steroid extracted with ethyl acetate. Evaporation of the washed extract afforded a partially crystalline solid which after purification by preparative thin layer chromatography and crystallization from acetone-petroleum ether afforded the title compound.

EXAMPLE 42

(a) 17,21-(1'-ethoxy-1'-ethylmethylenedioxy)-9α-fluoro-11β-hydroxy-16α-methylpregna-1,4-diene-3,20-dione A solution of 9α-fluoro-16α-methyl - 11β,17,21 - trihydroxypregna - 1,4 - diene-3,20-dione (2 g.) in dioxan (100 ml.) containing ethyl orthopropionate (2.5 ml.) and toluene p-sulphoric acid (52 mg.) was kept at room temperature for 1 hour. Dilution of the reaction mixture with dilute sodium bicarbonate solution afforded the crude orthoester which on crystallization from acetone-petroleum ether yielded the title compound.

M.P. 231–233° C. $\lambda_{max}$. 238 nm. ($\epsilon$ 15,800) (Found: C, 67.7; H, 7.5. C$_{27}$H$_{37}$FO$_6$ requires C, 68.05; H, 7.8%).

(b) 9α-fluoro-11β,21-dihydroxy-16α-methyl-17-propionyloxypregna-1,4-diene-3,20-dione 17,21-(1'-ethoxy - 1' - ethylmethylenedioxy)-9α-fluoro-11β-hydroxy - 16α - methylpregna - 1,4 - diene-3,20-dione (5.83 g.) was dissolved in acetone (240 ml.) and water (48 ml.) and 2 N-sulphuric acid (2.4 ml.) were added. The solution was allowed to stand at room temperature for 30 minutes and then poured into water and extracted with chloroform. The extract was washed, dried and evaporated and the crude solid crystallized from acetone-hexane to afford the title compound (3.6 g.) M.P. 219–223° [α]$_D$−6° (c. 1.0 chloroform) $\lambda_{max}$. 238 mm. ($\epsilon$ 15,700) (Found: C, 67.25; H, 7.0. C$_{25}$H$_{33}$FO$_6$ requires C, 67.0; H, 7.4%).

EXAMPLE 43

(a) 17,21-(1'-ethoxy-1'-ethylmethylenedioxy)-9α-fluoro-11β-hydroxy-16-methylenepregna-1,4-diene-3,20-dione Ethyl orthopropionate (1.79 g.) was added to a solution of 9α-fluoro - 16 - methylene-11β,17,21-trihydroxypregna - 1,4 - diene-3,20-dione (1.98 g.) in dioxan (100 ml.) containing toluene p-sulphonic acid (100 mg.) and the mixture kept at room temperature overnight. Dilution with water afforded the title compound. (2.14 g.) M.P. 217–226° C. [α]$_D$−3.4° (c. 1.0, dioxan), $\lambda_{max}$. 237 nm. ($\epsilon$ 15,600).

(b) 11β,21-dihydroxy-9α-fluoro-16-methylene-17-propionyloxypregna-1,4-diene-3,20-dione A solution of 17,21-(1'-ethoxy - 1' - ethylmethylene dioxy) - 9α - fluoro - 11β - hydroxy-16-methylenepregna-1,4-diene-3,20-dione (1.21 g.) in acetone (150 ml.) was treated at room temperature with 2 N-sulphuric acid (5 drops) for 10 minutes and then diluted with water and extracted with ethyl acetate. Evaporation of the organic extract and fractional crystallization of the residue from ethyl acetate afforded 11β,17-dihydroxy - 9α - fluoro-16-methylene - 21 - propionyloxypregna - 1,4 - diene - 3,20-dione (380 mg.) M.P. 196–200° C. [α]$_D$+30.6° (c. 1.0 dioxan). Evaporation of the mother liquors and fractional crystallization of the residue from methanol then afforded the title compound (250 mg.) M.P. 211–212° C. $\lambda_{max}$. 237 nm. ($\epsilon$ 15,800), [α]$_D$−101.0° (c. 1.0, dioxan) (Found: C, 67.0; H, 6.8. C$_{25}$H$_{31}$FO$_6$ requires C, 67.2; H, 7.0%).

EXAMPLE 44

(a) 9α-fluoro-11β-hydroxy-17,21-(1'-methoxy-1'-propylmethylenedioxy)-16α-methylpregna-1,4-diene-3,20-dione Toluene p-sulphonic acid (313 mg.) and methyl orthobutyrate (7.5 ml.) were added to a solution of 9α-fluoro - 11β,17,21 - trihydroxy - 16α - methylpregna-1,4-diene-3,20-dione (4.01 g.) in dioxan (200 ml.). After the mixture had been kept at room temperature for 4.5 hours dilute sodium bicarbonate solution was added and the precipitated orthoester (4.54 g.) removed by filtration. Crystallisation from acetone-petroleum ether afforded the title compound M.P. 179–185° C. (Kofler), [α]$_D$ +42.5° (c. 1.02, dioxan) $\lambda_{max}$. 237 nm. ($\epsilon$ 16,100) (Found: C, 67.75; H, 7.65. C$_{27}$H$_{37}$FO$_6$ requires C, 68.05; H, 7.8%).

(b) 17-butyryloxy-9α-fluoro-11β,21-dihydroxy-16α-methylpregna-1,4-diene-3,20-dione 9α-fluoro - 11β - hydroxy - 17,21 - (1'-methoxy-1'-propylmethylenedioxy) - 16α - methylpregna - 1,4 - diene-3,20-dione (4.25 g.) was dissolved in acetone (150 ml.)

and water (15 ml.) and 2 N-sulphuric acid (1.5 ml.) added. After 1.5 hours at room temperature about half of the solvent was removed in vacuo and the remaining solution diluted with water (1500 ml.) to give crude dexamethasone 17 - butyrate (3.84 g.). Crystallization from acetone-petroleum ether afforded pure title compound. M.P. 191.5–193° C. (Kofler) $[\alpha]_D +1.5°$ (c. 1.0, dioxan), $\lambda_{max.}$ 237 nm. ($\epsilon$ 15,500) (Found: C, 67.8; H, 7.5. $C_{26}H_{35}FO_6$ requires C, 67.5; H, 7.6%).

EXAMPLE 45

(a) 9α-fluoro-11β-hydroxy-17,21-(1' - isopropyl-1'-methoxymethylenedioxy) - 16α - methylpregna-1,4-diene-3,20-dione Methyl orthoisobutyrate (9 ml.) and toluene p-sulphonic acid (304 mg.) were added to a solution of 9α-fluoro - 11β,17,21 - trihydroxy - 16α - methylpregna-1,4-diene-3,20-dione (4.0 g.) in dioxan (200 ml.). The clear solution was kept at room temperature for 4 days and then heated on the steam bath for 30 minutes. Dilution with water afforded the crude orthoester (4.63 g.) which was filtered off, dried and crystallised from acetone-petroleum ether to yield the title compound. M.P. 212–219° C. (Kofler), $[\alpha]_D +43.8°$ (c. 1.0, dioxan), $\lambda_{max.}$ 237 nm. ($\epsilon$ 15,900) (Found: C, 67.7; H, 7.7. $C_{27}H_{37}FO_6$ requires C, 68.05; H, 7.8%).

(b) 9α-fluoro-11β,21-dihydroxy-17-isobutyryloxy-16α-methylpregna-1,4-diene-3,20-dione 9α-fluoro - 11β - hydroxy - 17,21 - (1' - isopropyl-1'-methoxymethylenedioxy) - 16α - methylpregna-1,4-diene-3,20-dione (4.35 g.) in acetone (170 ml.) containing water (17 ml.) was treated with 2 N-sulphuric acid (1.1 ml.). After 1.5 hours at room temperature about half of the solvent was evaporated in vacuo and the remaining solution diluted with water (1.5 l.). The precipitate was filtered off, dried and recrystallised from acetone-petroleum ether to give the title compound M.P. 225–235° C. (Kofler), $[\alpha]_D +4.9°$ (c. 1.0, dioxan), $\lambda_{max.}$ 238 nm. ($\epsilon$ 15,900) (Found: C, 67.4; H, 7.4. $C_{26}H_{35}FO_6$ requires C, 67.5; H, 7.6%).

EXAMPLE 46

17-acetoxy-9α-fluoro-11β,21-dihydroxy-16-methylene-pregna-1,4-diene-3,20-dione (1) via 17,21-ethylorthoacetate.—A suspension of 9α-fluoro-11β,17,21-trihydroxy - 16 - methylene pregna-1,4-diene-3,20-dione (7.67 g.) in dioxan (380 ml.) was gently warmed on the steam bath for a few minutes and then cooled to room temperature and ethyl orthoacetate (7.18 ml.) and toluene p-sulphonic acid (155 mg.) added. The mixture was stirred for 24 hours and then poured into dilute sodium bicarbonate solution. The crystalline precipitate was filtered off, dried and recrystallised from acetone-petroleum ether to afford 17,21-(1-(1'-ethoxy-1'-methylmethylenedioxy)-9α-fluoro - 11β - hydroxy - 16-methylenepregna-1,4-diene-3,20-dione M.P. 206–209° C. (Koffer). $[\alpha]_D -8.0°$ (c. 1.0, dioxan), $\lambda_{max.}$ 237 mm. ($\epsilon$ 16,700 (Found: C, 67.75; H, 6.8. $C_{26}H_{33}FO_6$ requires C, 67.8; H, 7.2%).

The above 9α-fluoro-16-methyleneprednisolone 17,21-ethyl orthoacetate (4.0 g.) in acetone (130 ml.) containing water (30 ml.) was treated at room temperature with 2 N-sulphuric acid (1.2 ml.) for 10 minutes. Dilution with water (1 l.) gave a crystalline solid which was extracted with ethyl acetate, washed with water, dried and evaporated in vacuo until about 70 ml. of solvent remained. On cooling colourless needles (2.25 g.) separated which on recrystallization from ethyl acetate afforded the title compound. M.P. 180–200° C. (Kofler), $[\alpha]_D -119°$ (c. 1.05, dioxan) $\lambda_{max.}$ 237–239 nm. ($\epsilon$ 16,500) (Found: C, 66.2; H, 6.7. $C_{24}H_{29}FO_6$ requires C, 66.6; H, 6.8%).

(2) By selective hydrolysis of the 17,21-diacetate.—A suspension of 21-acetoxy-9α-fluoro-11β,17-dihydroxy-16-methylenepregna-1,4-diene-3,20-dione (901 mg.) and toluene p-sulphonic acid (903 mg.) in methylene chloride (90 ml.) was treated with acetic anhydride (9 ml.) and the mixture was stirred at room temperature for 22.5 hours. After washing with dilute sodium bicarbonate solution the mixture was evaporated in vacuo and the residue stirred with ethanol (60 ml.) and saturated sodium bicarbonate solution (90 ml.) for 45 minutes. The ethanol was removed in vacuo and the oily product extracted into chloroform. Evaporation of the washed and dried extract afforded a froth which after purification by preparative thin layer chromatography and crystallisation from acetone-petroleum ether yielded colourless crystals of the 17,21-diacetate M.P. 230–232° C. decomp. (Kofler), $[\alpha]_D -34°$ (c. 1.0, dioxan) $\lambda_{max.}$, 236–237 nm. ($\epsilon$ 16,300).

The above 9α-fluoro-16-methyleneprednisolone-17,21-diacetate (246 mg.) in methanol (16.7 ml.) was cooled in ice and treated with aqueous perchloric acid (72%; 0.44 ml.) and kept at 0° for 2 days. After dilution with water the precipitated material was extracted with chloroform, washed with water, dried (MgSO₄) and evaporated. The crude product was purified by preparative thin layer chromatography and crystallisation from first acetone-petroleum ether and then aqueous methanol to give colourless needles of the title compound M.P. 172–178° C. (last traces 200° C.) (Kofler) with infrared and proton magnetic resonance spectra similar to that of the 17,21-diacetate prepared via the orthoester in (1) above.

EXAMPLE 47

17-acetoxy-9α,21-difluoro-11β-hydroxy-16β-methyl-pregna-1,4-diene-3,20-dione

A suspension of 9α-21-difluoro-11β,17-dihydroxy-16β-methylpregna-1,4-diene-3,20-dione (323 mg.) in methylene chloride (40 ml.) containing acetic anhydride (3 ml.) and toluene p-sulphonic acid (337 mg.) was stirred at room temperature for seven days. A little methanol was added and the clear solution was stirred for a further 30 minutes. After washing with dilute sodium bicarbonate and water the solvent was evaporated and the residue purified by preparative thin layer chromatography and crystallisation from acetone-petroleum ether, to give the title compound.

EXAMPLE 48

9α,21-difluoro-11β-hydroxy-16β-methyl-17-valeryloxy-pregna-1,4-diene-3,20-dione

Following the method of Example 40 but using valeric anhydride in place of propionic anhydride the title compound was prepared.

EXAMPLE 49

17-acetoxy-21-chloro-9α-fluoro-11β-hydroxy-16β-methylpregna-1,4-diene-3,20-dione Following the method of Example 40 but using 21-chloro-9α-fluoro-11β,17-dihydroxy - 16β - methylpregna-1,4-diene-3,20-dione in place of 9α,21-difluoro-11β,-17-dihydroxy-16β-methylpregna-1,4-diene-3,20-dione and acetic anhydride in place of propionic anhydride the title compound was prepared.

EXAMPLE 50

17-acetoxy-21-bromo-9α-fluoro-11β-hydroxy-16β-methylpregna-1,4-diene-3,20-dione

Following the method of Example 40 but using 21-bromo-9α-fluoro-11β,17-dihydroxy - 16β - methylpregna-1,4-diene-3,20-dione in place of 9α,21-difluoro-11β,17-dihydroxy-16β-methylpregna-1,4-diene-3,20-dione and acetic anhydride in place of propionic anhydride the title compound was prepared.

EXAMPLE 51

21-chloro-9α-fluoro-11β-hydroxy-16β-methyl-17-propionyloxypregna-1,4-diene-3,20-dione Following the method of Example 40 but using 21-chloro-9α-fluoro-11β,17-dihydroxy - 16β - methylpregna-1,4-diene-3,20-dione in place of 9α-,21-difluoro-11β,17-dihydroxy-16β-methylpregna-1,4-diene-3,20-dione the title compound was prepared.

EXAMPLE 52

17-acetoxy-9α-fluoro-11β-hydroxy-21-iodo-16β-methyl-pregna-1,4-diene-3,20-dione (a) 17 - acetoxy - 21 - bromo - 9α - fluoro-11β-hydroxy-16β - methylpregna - 1,4 - diene - 3,20 - dione (2.097 g.) in acetone (90 ml.) was treated with potassium iodide and the mixture was refluxed for three days. About half of the solvent was removed in vacuo and the residue diluted with water and the precipitated solid removed by filtration. Filtration of the residue in benzene-ethyl acetate (3:1) through Florisil and crystallisation from acetone-petroleum ether afforded the title compound.

(b) A mixture of 9α-fluoro-11β,17-dihydroxy-21-iodo-16β-methylpregna-1,4-diene-3,20-dione (1 g.) and acetic anhydride (12 ml.) containing 60% perchloric acid (0.012 ml.) in benzene (200 ml.) was stirred at room temperature for 2.5 hours. The solution was washed with dilute sodium bicarbonate solution and water and was evaporated to dryness in vacuo. Chromatography of the residue over grade IV neutral alumina gave, after crystallization from acetone-petroleum ether of the material eluted with benzene and benzene-ethyl acetate (9:1) the title compound.

EXAMPLE 53

17-acetoxy-9α,21-difluoro-16β-methylpregna-1,4-diene-3,11-20-trione

A solution of 17-acetoxy-9α,21-difluoro-11β-hydroxy-16β-methylpregna-1,4-diene-3,20-dione (28 mg.) in acetone (5 ml.) was cooled in an ice-bath and treated slowly with stirring with a solution of chromic acid (0.029 ml.) prepared from chromium trioxide (66.7 g.) in water (250 ml.) containing concentrated sulphuric acid (53.3 ml.). After 4 hours the mixture was allowed to stand at room temperature for 20 minutes after which time ether was added and the mixture washed thoroughly with water and then the solvent was removed in vacuo. The residue was crystallised from acetone-petroleum ether to afford the title compound.

EXAMPLE 54

17-acetoxy-21-bromo-9α-fluoro-16β-methylpregna-1,4-diene-3,11,20-trione

Following the method of Example 53 but using 17-acetoxy-21-bromo-9α-fluoro - 11β - hydroxy-16β-methylpregna-1,4,-diene-3,20-dione in place of 17-acetoxy-9α,21-difluoro-11β-hydroxy - 16β - methylpregna - 1,4 - diene-3,20-dione the title compound was prepared.

EXAMPLE 55

(a) 17,21 - (1' - ethoxy-1' - methylmethylenedioxy)-9α-fluoro-11β-hydroxy-16α-methylpregna-1,4-diene - 3,20-dione A solution of 9α-fluoro-11β,17,21 - trihydroxy - 16α-methylpregna-1,4-diene-3,20-dione (2 g.) in dioxan (80 ml.) was treated with ethyl orthoacetate (5 ml.) and toluene p-sulphonic acid monohydrate (40 mg.) and the mixture kept at room temperature for 6 hours. Dilution with water containing a little sodium bicarbonate afforded the crude product which on crystallization from ether-petroleum ether gave the title compound as fine needles M.P. 276–278°, [α]$_D$ +47° (c. 0.8 dioxan) λ$_{max}$. 237–239 nm. (ε 15,950), (Found: C, 67.8; H, 7.4. $C_{26}H_{35}FO_6$ requires C, 67.5; H, 7.6%).

(b) 17-acetoxy-9α-fluoro-11β,21-dihydroxy-16α-methyl-pregna-1,4-diene-3,20-dione 17,21-(1' - ethoxy - 1' - methylmethylenedioxy) - 9α-fluoro-11β-hydroxy-16α-methylpregna - 1,4 - diene - 3,20-dione (1.4 g.) in acetic acid (12 ml.) containing water (2 ml.) was kept at room temperature for 2.5 hours. Dilution with water gave the crude product which on crystallization from ether-acetone-petroleum ether afforded the title compound as small plates M.P. 245–247.5° (cap) [α]$_D$ +9.5° (c. 0.9 dioxan), λ$_{max}$. 237–238 nm. (ε 16,080), (Found: C, 66.4; H, 7.1. $C_{24}H_{31}FO_6$ requires C, 66.3; H, 7.2%).

EXAMPLE 56

17 - acetoxy - 9α - fluoro - 11β - hydroxy - 21 - methanesulphonyloxy-16α-methylpregna-1,4-diene-3,20-dione 17-acetoxy - 9α-fluoro - 11β,21-dihydroxy - 16α-methyl-pregna-1,4-diene-3,20-dione (1.144 g.) in pyridine (8 ml.) was treated with methanesulphonyl chloride at room temperature. After 20 minutes the solution was poured into dilute hydrochloric acid and the title compound removed by filtration. Its infra-red spectrum showed ν max. (in $CHBr_3$) 3580, 1725, 1666, 1625 and 1360 cm.$^{-1}$.

EXAMPLE 57

17-acetoxy-21-chloro-9α-fluoro-11β-hydroxy-16α-methyl-pregna-1,4-diene-3,20-dione Following the method of Example 13 but using dexamethasone 17-acetate 21-methanesulphonate in place of betamethasone 17-acetate 21-methanesulphonate a crude product was obtained which was purified by chromatography over grade I neutral alumina and crystallisation from ethanol.

EXAMPLE 58

9α-fluoro-11β-hydroxy-21-iodo-16α-methyl-17-propionyl-oxypregna-1,4-diene-3,20-dione (a) A solution of 21 - bromo-9α-fluoro-11β-hydroxy-16α - methyl - 17 - propionyloxypregna - 1,4 - diene - 3,20-dione (501 mg.) in ethyl methyl ketone (20 ml.) containing potassium iodide (1 g.) was refluxed for 21 hours. About half the solvent was evaporated and the residue was diluted with water to afford crude product which was purified by filtration through grade III neutral alumina and crystallization from acetone-petroleum ether to give the title compound.

(b) 9α - fluoro - 11β - hydroxy - 21 - methanesulphonyl-oxy-16α-methyl - 17 - propionyloxypregna - 1,4 - diene-3,20-dione (993 mg.) in hexamethylphosphoramide (50 ml.) containing sodium iodide (2.01 g.) was kept at 70° C. for 44 hours after which time the solution was diluted with water (500 ml.) and the solid removed by filtration. Purification by chromatography and crystallization from acetone-petroleum ether afforded the title compound having infra-red and proton magnetic resonance spectra similar to the sample prepared in Example 58 (a) above.

EXAMPLE 59

21-bromo-9α-chloro-11β-hydroxy-16β-methyl-17-propionyloxy-pregna-1,4-diene-3,20-dione Prepared by the method described for Example 26 but using 9α - chloro-11β-hydroxy-21-methanesulphonyloxy-16β - methyl-17-propionyloxypregna-1,4-diene-3,20-dione-in place of betamethasone 17-acetate 21-methanesulphonate. The product was crystallized from acetone-petroleum ether.

EXAMPLE 60

17-acetoxy-9α-chloro-11β-hydroxy-21-oido-16β-methylpregna-1,4-diene-3,20-dione

Prepared by the method described for Example 37, but using 17 - acetoxy-9α-chloro-11β-hydroxy-21-methanesulphonyloxy-16β-methylpregna-1,4-diene-3,20-dione in place betamethasone 17-butyrate 21-methanesulphonate. The product was crystallized from acetone-petroleum ether.

EXAMPLE 61

17-butyryloxy-9α-fluoro-11β,21-dihydroxy-16-methylenepregna-1,4-diene-3,20-dione A suspension of 9α - fluoro-11β,17,21-trihydroxy-16-methylenepregna-1,4-diene-3,20-dione (7.67 g.) in dioxan (380 ml.) was gently warmed until most of the solid had dissolved and then cooled to room temperature. Trimethyl orthobutyrate (5.82 g.) and toluene p-sulphonic acid (155 mg.) were added and the mixture kept at room temperature with stirring for 9 days; further amounts of toluene p-sulphonic acid (465 and 310 mg.) being added after 2½ and 4 days and more trimethyl orthobutyrate (1.25 g.) after 7 days. The clear solution was poured into 2% sodium bicarbonate solution and the crude steroid orthoester removed by filtration. Part of this orthoester (5 g.) was dissolved in acetone (160 ml.) and water (40 ml.) and 2 N-sulphuric acid (1.5 ml.) added. After 15 minutes the mixture was poured into water and the precipitated material extracted with ethyl acetate. Evaporation of the washed and dried extract to small bulk afforded crystalline material which was purified by preparative thin layer chromatography and crystallization from ethyl acetate to give the title compound M.P. 216–219° (K), $[α]_D$-104° (c. 1.0, dioxan) $λ_{max.}$ 237 nm. (ε 16,100) (Found: C, 67.8; H, 7.3. $C_{26}H_{33}FO_6$ requires C, 67.8: H, 7.2%).

EXAMPLE 62

17-butyryloxy-9α-fluoro-11β-hydroxy-21-methanesulphonyloxy-16-methylenepregna-1,4-diene-3,20-dione A solution of 17 - butyryloxy - 9α-fluoro-11β,21-dihydroxy-16-methylenepregna-1,4-diene-3,20-dione (500 mg.) in pyridine (17 ml.) was treated with methanesulphonyl chloride (0.7 ml.) at 0°. After 30 minutes the solution was poured into dilute sulphuric acid and the title compound isolated by extraction was ethyl acetate.

EXAMPLE 63

17-butyryloxy-21-chloro-9α-fluoro-11β-hydroxy-16-methylenepregna-1,4-diene-3,20-dione A solution of 17-butyryloxy-9α-fluoro-11β-hydroxy-21-methanesulphonyloxy-16-methylenepregna-1,4-diene-3,20-dione (401 mg.) in acetone (50 ml.) containing lithium chloride (1.25 g.) was refluxed for 27 days. Evaporation of most of the solvent and dilution with water yielded the title compound which was purified by preparative thin layer chromatography and crystallization from acetone-petroleum ether.

EXAMPLE 64

2-bromo-17-butyryloxy-9α-fluoro-11β-hydroxy-16-methylenepregna-1,4-diene-3,20-dione A solution of 17-butyryloxy-9α-fluoro-11β-hydroxy-21-methanesulpohnyloxy-16-methylenepregna-1,4-diene-3,20-dione (401 mg.) in acetone (50 ml.) containing lithium bromide (1.25 g.) was refluxed for 40 hours. Evaporation of most of the solvent and dilution with water gave the title compound which was purified by crystallization from methanol.

EXAMPLE 65

17-butyryloxy-9α-fluoro-11β-hydroxy-21-iodo-16-methylenepregna-1,4-diene-3,20-dione 17 - butyryloxy - 9α-fluoro-11β-hydroxy-21-methanesulphonyloxy-16-methylenepregna-1,4-diene-3,20-dione (400 mg.) in ethyl methyl ketone (75 ml.) was treated with sodium iodide (1.12 g.) and the mixture refluxed for 1 day. The solvent was evaporated and the residue was partitioned between water and ethyl acetate. The organic extract was washed with sodium thiosulphate solution and water and evaporated in vacuo to afford the title compound which was purified by preparative thin-layer chromatography and crystallization from acetone-petroleum ether.

EXAMPLE 66

9α-fluoro11β,21-dihydroxy-17-isobutyryloxy-16-methylenepregna-1,4-diene-3,20-dione A suspension of 9α - fluoro-11β,17,21-trihydroxy-16-methylenepregna - 1,4-diene-3,20-dione (5 g.) in dioxan (250 ml.) was treated with trimethyl orthoisobutyrate (4.22 g.) and toluene p-sulphonic acid (100 mg.) and the mixture kept at room temperature. A further portion of trimethyl orthoisobutyrate (1.06 g.) was added after 3 hours and more toluene p-sulphonic acid (25 mg.) after 4 hours. After 29 hours the solution was poured into dilute sodium bicarbonate solution and the crude steroid 17,21-methyl orthoisobutyrate removed by filtration.

A portion of this orthoester (3 g.) in acetone (95 ml.) containing water (22 ml.) and 2 N-sulphuric acid (0.88 ml.) was kept at room temperature for 15 minutes and then poured into water. The precipitated solid was removed by filtration and purified by preparative thin layer chromatography and crystallisation from ethyl acetate and acetone-petroleum ether to give the title compound M.P. 223° decomp. (K) $[α]_D$—83.3; (c. 1.0 DMSO). $λ_{max.}$ 238 nm. (ε 16,050) (Found: C, 67.8; H, 7.1. $C_{26}H_{33}FO_6$ requires C, 67.8; H, 7.2%).

EXAMPLE 67

9α-fluoro-11β-hydroxy-17-isobutyryloxy-21-methanesulphonyloxy-16-methylenepregna-1,4-diene-3,20-dione Prepared by the method described in Example 1 but using 9α - fluoro - 11β,21-dihydroxy-17-isobutyryloxy-16-methylenepregna - 1,4 - diene-3,20-dione in place of betamethasone 17-propionate. The title compound was obtained by dilution of the reaction mixture with dilute sulphuric acid and filtration of the precipitated solid.

EXAMPLE 68

21-chloro-9α-fluoro-11β-hydroxy-17-isobutyryloxy-16-methylenepregna-1,4-diene-3,20-dione A solution of 9α-fluoro-11β-hydroxy-17-isobutyryloxy-21 - methanesulphonyloxy - 16 - methylenepregna-1,4-diene-3,20-dione (200 mg.) in ethyl methyl ketone (25 ml.) containing lithium chloride was refluxed for 8 days. After removal of the solvent in vacuo the residue was partitioned between ethyl acetate and water and the organic extract further purified by preparative thin layer chromatography and crystallisation from acetone-petroleum ether to afford the title compound.

EXAMPLE 69

21-bromo-9α-fluoro-11β-hydroxy-17-isobutyryloxy-16-methylenepregna-1,4-diene-3,20-dione Prepared by the method described in Example 35, but using 9α - fluoro - 11β - hydroxy-17-isobutyryloxy-21-methanesulphonyloxy - 16 - methylenepregna - 1,4-diene-3,20-dione in place of 17-acetoxy-9α-fluoro-11β-hydroxy-21 - methanesulphonyloxy - 16 - methylenepregna - 1,4-diene-3,20-dione. The title compound was crystallized from acetone-petroleum ether.

EXAMPLE 70

9α-fluoro-11β-hydroxy-21-iodo-17-isobutyryloxy-16-methylenepregna-1,4-diene-3,20-dione A solution of 9α-fluoro-11β-hydroxy-17-isobutyryloxy-21 - methanesulphonyloxy - 16 - methylenepregna-1,4-diene-3,20-dione (201 mg.) in ethyl methyl ketone (37.5 ml.) containing sodium iodide (556 mg.) was refluxed for 24 hours. The solvent was evaporated and the residue was partitioned between ethyl acetate and water. The washed and dried extract was evaporated to afford the title compound which was purified by preparative thin layer chromatography and crystallization from acetone-petroleum ether.

EXAMPLE 71

17-acetoxy-9α-fluoro-11β-hydroxy-21-iodo-16-methylenepregna-1,4-diene-3,20-dione Prepared by the method described in Example 70 but using 17 - acetoxy - 9α - fluoro-11β-hydroxy-21-methanesulphonyloxy-16-methylenepregna-1,4-diene-3,20-dione in place of 9α - fluoro - 11β-hydroxy-17-isobutyryloxy-21-methanesulphonyloxy-16-methylenepregna-1,4-diene-3,20-dione.

EXAMPLE 72

21-chloro-9α-fluoro-16β-methyl-17-propionyloxypregn-4-ene-3,11,20-trione

The title compound was prepared and purified as described in Example 53 but using 21-chloro-9α-fluoro-11β-hydroxy - 16β - methyl-17-propionyloxypregn-4-ene-3,20-dione in place of 17-acetoxy-9α,21-difluoro-11β-hydroxy-16β-methylpregna-1,4-diene-3,20-dione.

EXAMPLE 73

17-acetoxy-9α,21-difluoro-11β-hydroxy-16-methylenepregna-1,4-diene-3,20-dione

A suspension of 9α,21-difluoro-11β,17-dihydroxy-16-methylenepregna-1,4-diene-3,20-dione (492 mg.) in acetic acid (5 ml.) containing trifluoroacetic anhydride (1.0 ml.) was heated at 80° for 5.5 hours. Dilution with water yielded the crude product which was purified by preparative thin layer chromatography and crystallization from acetone-petroleum ether and then methanol to give the title compound.

EXAMPLE 74

17-butyryloxy-9α,21-difluoro-11β-hydroxy-16-methylenepregna-1,4-diene-3,20-dione Prepared by the method described in Example 73 but using butyric acid in place of acetic acid. The reaction mixture was diluted with water and extracted into ethyl acetate to give the crude product which was purified by preparative thin layer chromatography and crystallization from acetone-petroleum ether and then methanol to afford the title compound.

EXAMPLE 75

9α,21-difluoro-11β-hydroxy-17-isobutyryloxy-16-methylenepregna-1,4-diene-3,20-dione Prepared and purified by the method described in Example 40 but using 9α,21-difluoro-11β,17-dihydroxy-16-methylenepregna-1,4-diene-3,20-dione in place of 9α,21-difluoro - 11β,17 - dihydroxy-16β-methylpregna-1,4-diene-3,20-dione. The title compound was crystallized from ethyl acetate-petroleum ether and then aqueous methanol.

EXAMPLE 76

17-acetoxy-9α,21-difluoro-16-methylenepregna-1,4-diene-3,11,20-trione

Prepared by the method described in Example 53 but using 17 - acetoxy - 9α,21 - difluoro-11β-hydroxy-16-methylenepregna - 1,4 - diene - 3,20-dione in place of 17-acetoxy - 9α,21 - difluoro-11β-hydroxy-16β-methylpregna-1,4-diene-3,20-dione and carrying out the reaction at room temperature instead of 0°. The title compound was crystallised first from acetone-petroleum ether and then methanol.

EXAMPLE 77

17-butyryloxy-9α,21-difluoro-16-methylenepregna-1,4-diene-3,11,20-trione

Prepared by the method described in Example 53 but using 17 - butyryloxy - 9α,21 - difluoro-11β-hydroxy-16-methylenepregna-1,4-diene,3,20-dione in place of 17-acetoxy - 9α,21 - difluoro-11β-hydroxy-16β-methylpregna-1,4-diene-3,20-dione and carrying out the reaction at room temperature instead of 0°. The title compound was obtained as a white solid by trituration of the crude product with petroleum ether.

EXAMPLE 78

17-butyryloxy-21-chloro-9α-fluoro-16α-methylpregna-1,4-diene-3,11,20-trione

Prepared by the method described in Example 53 but using 17 - butyryloxy - 21-chloro-9α-fluoro-11β-hydroxy-16α-methylpregna-1,4-diene-3,20-dione in place of 17-acetoxy - 9α,21 - difluoro-11β-hydroxy-16β-methylpregna-1,4-diene-3,20-dione. The title compound was crystallized from ether.

EXAMPLE 79

9α-fluoro-11β,21-dihydroxy-16β-methyl-17-propionyloxypregn-4-ene-3,20-dione

A solution of 9α - fluoro - 11β,17-21-trihydroxy-16β-methylpregn-4-ene-3,20-dione (1g.) in dioxan (40 ml.) was treated with triethyl orthopropionate (2 ml.) and toluene p-sulphonic acid (15 mg.) After 50 minutes at room temperature the solution was poured into water containing a little sodium bicarbonate and a drop of pyridine. The steroid ethyl orthopropionate was removed by filtration and dried. This material in acetic acid (35 ml.) containing water (0.7 ml.) was kept at room temperature for 15 minutes after which time the solution was diluted with water and the solid removed. Crystallization from acetone-petroleum ether gave the title compound M.P. 171° decomp., $[\alpha]_D$ +114° (c. 1.0 dioxan), $\lambda_{max}$. 236 nm. ($\epsilon$ 17,300) (Found: C, 66.7; H, 7.9; $C_{25}H_{35}FO_6$ requires C, 66.65; H, 7.8%).

EXAMPLE 80

9α-fluoro-11β-hydroxy-21-methanesulphonyloxy-16β-methyl-17-propionyloxypregn-4-ene-3,20-dione Prepared by the method described in Example 1 but using 9α - fluoro - 11β,21 - dihydroxy-16β-methyl-17-propionyloxypregn-4-ene-3,20-dione in place of betamethasone 17-propionate. The title compound crystallized from acetone-petroleum ether as its acetone solvate M.P. 117–123° (K) with loss of solvent $\lambda_{max}$. 237 nm. ($\epsilon$ 16,600) (Found: C, 59.3; H, 7.3; S, 6.0. $C_{26}H_{67}FO_8S$. $Me_2CO$ requires C, 59.35; H, 7.4; S, 5.5%).

EXAMPLE 81

21-chloro-9α-fluoro-11β-hydroxy-16β-methyl-17-propionyloxypregn-4-ene-3,20-dione 9α - fluoro - 11β - hydroxy - 21 - methanesulphonyloxy-16β - methyl - 17 - propionyloxypregn-4-ene-3,20-dione (745 mg.) in acetone (25 ml.) was added to a solution of lithium chloride (1.57 g.) in dimethylformamide (20 ml.) and the mixture refluxed for 26 hours. The acetone was evaporated in vacuo and the residual solution was diluted with water. The title compound which crystallized out was purified by crystallization from acetone-petroleum ether.

EXAMPLE 82

21-bromo1-9α-fluoro-11β-hydroxy-16β-methyl-17-propionyloxypregn-4-ene-3,20-dione The title compound was prepared and purified as described in Example 81 but using lithium bromide in place of lithium chloride.

EXAMPLE 83

21-chloro-9α-fluoro-11β,17-dihydroxy-16β-methylpregna-1,4-diene-3,20-dione

A solution of betamethasone 21-methanesulphonate (4 g.) in dimethylformamide (25 ml.) was treated with lithium chloride (4 g.) and the mixture heated on the steam bath for 30 minutes. Dilution with water gave the crude product which was recrystallized to afford the title compound, M.P. 226°, $[\alpha]_D$ +138° (c. 0.4, dioxan), $\lambda_{max}$. 238 nm. ($\epsilon$ 15,500) (Found: C, 63.1; H, 6.9; Cl, 8.7; F, 4.65. $C_{22}H_{28}ClFO_4.\frac{1}{2}$ $H_2O$ requires C, 62.9; H, 7.0; Cl, 8.45; F, 4.5%).

EXAMPLE 84

21-bromo-9α-fluoro-11β,17-dihydroxy-16β-methylpregna-1,4-diene-3,20-dione

A solution of betamethasone 21-methanesulphonate (7 g.) in dioxan containing tetrabutyl ammonium bromide (14 g.) was heated on the steam bath for 30 minutes. Dilution with water gave the crude product which was crystallized from chloroform-methanol to yield the title compound M.P. 190–191°, $[\alpha]_D$ +131° (c. of 0.8 dioxan), $\lambda_{max.}$ 238 nm. (ε 15,400) (Found: C, 58.05; H, 6.2; Br, 18.0; F, 4.15. $C_{22}H_{28}BrFO_4$ requires C, 58.05; H, 6.2; Br, 17.55; F, 4.15%).

EXAMPLE 85

21-bromo-9α-fluoro-16β-methyl-17-propionyloxypregna-1,4-diene-3,11-trione

A solution of 9α-fluoro-21-methanesulphonyloxy-16β-methyl - 17 - propionyloxypregna - 1,4 - diene-3,11,20-trione (599 mg.) in ethyl methyl ketone (25 ml.) containing lithium bromide (1.2 g.) was refluxed for 3 days. Evaporation of about half of the solvent and dilution of the residue with water afforded the crude product which was crystallized from acetone-petroleum ether to give the title compound M.P. 205–208° (K), $[\alpha]_D$ +136.1° (c. 1.03 dioxan) $\lambda_{max.}$ 233 nm. (ε 16,500) (Found: C, 59.15; H, 5.9; Br, 15.55. $C_{25}H_{30}BrFO_5$ requires C, 58.95; H, 5.9; Br, 15.7%).

EXAMPLE 86

9α,21-difluoro-11β,17-dihydroxy-16-methylenepregna-1,4-diene-3,20-dione

A solution of 9α-fluoro-11β,17,21-trihydroxy-16-methylenepregna-1,4-diene-3,20-dione (4 g.) in pyridine (20 ml.) was treated with stirring at 0° with methanesulphonyl chloride (8 ml.). After 30 minutes the excess reagent was destroyed by careful addition of water and the mixture was then poured into N-sulphuric acid. The crude product was removed by filtration and dried. A portion (900 mg.) was purified by dissolving in chloroform containing a little ethanol and washing with sodium carbonate and water. Most of the organic solvent was removed in vacuo and the resulting solution was filtered through a little grade III neutral alumina. The residue obtained by evaporation of the solvent was dissolved in acetone (20 ml.) containing sodium iodide (1.6 g.) and the solution kept at room temperature for 17 hours. Most of the solvent was boiled off and water was carefully added to give 9α-fluoro-11β,17-dihydroxy-21-iodo-16-methylenepregna-1,4-diene-3,20-dione.

A portion of this material (385 mg.) was dissolved in warm acetonitrile (8 ml.) and 50 percent aqueous silver fluoride solution (0.5 ml.) added and the mixture kept at 50° for 3 hours, a further portion of the silver fluoride solution being added after 1.75 hours. After dilution with more acetonitrile the dark mixture was filtered through a little kieselguhr. Evaporation of the bulk of the solvent and addition of water gave the crude crystalline product which was purified by preparative thin layer chromatography and crystallisation from aqueous methanol to afford the title compound M.P. 274–276 decomp. (K).

EXAMPLE 87

9α,21-difluoro-11β-hydroxy-16-methylene-17-propionyloxypregna-1,4-diene-3,20-dione 9α,21 - difluoro-11β-methanesulphonyloxy-16β-methylene-1,4-diene-3,20-dione (1.0 g.) suspended in propionic acid (10 ml.) and trifluoroacetic anhydride (2 ml.) was stirred and heated at 80° C. for 21½ hours. More trifluoroacetic anhydride (2 ml.) was then added and the reaction was continued for a further 2 hours. The mixture was treated with water (150 ml.) and the product was extracted with ethyl acetate (3 × 100 ml.); the extracts were washed with saturated sodium bicarbonate (6 × 100 ml.), water (3 × 100 ml.), dried (magnesium sulphate) and evaporated under reduced pressure. The residue was triturated with petrol to give a light brown solids which was purified by preparative thin layer chromatography and crystallisation from methanol to afford colourless needles of the title compound, M.P. 240–243° (Kofler), $[\alpha]_D$ −94° (c. 0.93, dimethylsulphoxide), $\lambda_{max.}$ (in ethanol) 239 nm. (ε 16,100). (Found (percent): C, 67.05; H, 6.8; F, 8.4. $C_{25}H_{30}F_2O_5$ requires: C, 66.9; H, 6.7; F, 8.5).

EXAMPLE 88

9α,21-difluoro-16-methylene-17-propionyloxy-pregna-1,4-diene-3,11,20-trione

9α,21 - difluoro - 11β - hydroxy-16-methylene-17-propionyloxy-pregna-1,4-diene-3,20-dione (285 mg.) in acetone (15 ml.) was stirred at room temperature and treated with 4 N Jones reagent (0.319 ml., 2.0 mole eq.) dropwise during 80 minutes. The reaction mixture was poured into ether (100 ml.) and the organic phase was washed with water (3 × 15 ml.), dried (magnesium sulphate) and volatile material was removed under reduced pressure to give a colourless foam (279 mg, 98%). Two recrystallisations from methanol gave the title 11-ketone as colourless crystals, M.P. 177–178° (Kofler), $[\alpha]_D$ −55°, (c. 1.07), dimethylsulphoxide), $\lambda_{max.}$ (in ethanol) 236 nm. (ε 15,850). (Found (percent): C, 67.1; H, 6.4; F, 8.7. $C_{25}H_{28}F_2O_5$ requires C, 67.25; H, 6.3; F, 8.5).

(The 4 N Jones reagent used in this example was prepared by dissolving 66.7 g. chromium trioxide in a little water and adding 53.3 ml. of concentrated sulphuric acid. The mixture was then made up to 250 ml. with water.)

TABLE II

In the table below the following abbreviations are used—K=Kofler; Di=Dioxan; Py=Pyridine; DMSO=Dimethylsulphoxide

| Example number | Reaction time | M.P. (°C.) | $[\alpha]_D$ | U.V. spectrum $\lambda_{max.}^{n.m.}$ | ε | Analysis, percent Found percent | | | | | Requires | | | | |
|---|---|---|---|---|---|---|---|---|---|---|---|---|---|---|---|
| | | | | | | C | H | F | Cl | Br | C | H | F | Cl | Br |
| 13 | 3 days | 224–227 (K) | +100.2° (c. 1.21 Di) | 238 | 15,600 | 63.7 | 6.8 | | 8.0 | | $C_{27}H_{36}ClFO_5$ | 63.6 | 6.7 | | 7.8 | |
| 14 | 2 days | 195.5–107 (K) | +103.8° (c. 1.04 Di) | 237 | 15,100 | 64.3 | 6.9 | | 7.8 | | $C_{28}H_{32}ClFO_5$ | 64.3 | 6.9 | | 7.6 | |
| 15 | do | 172–173 (K) | +100.5° (c. 0.96 Di) | 239 | 15,400 | 64.8 | 7.0 | | 7.3 | | $C_{29}H_{34}ClFO_5$ | 64.9 | 7.1 | | 7.4 | |
| 16 | 5 days | 191–192.5 (K) | +100.8° (c. 1.03 Di) | 238 | 16,400 | 64.95 | 7.3 | | 7.25 | | $C_{29}H_{34}ClFO_5$ | 64.9 | 7.1 | | 7.4 | |
| 17 | do | 204–205 decomp | | | | 61.7 | 6.4 | | 14.5 | | $C_{28}H_{32}Cl_2O_5$ | 62.1 | 6.7 | | 14.7 | |
| 18 | 4 days | 240–242 decomp | −128° (c. 1.0 Di) | | | 61.4 | 6.4 | | 14.7 | | $C_{29}H_{34}Cl_2O_5$ | 61.4 | 6.9 | | 15.1 | |
| 19 | 6 days | 228–231 decomp. (K) | −129.0° (c. 1.01 Di) | 237 | 15,300 | 64.6 | 7.1 | | | | $C_{28}H_{36}ClSiFO_5$ | 64.3 | 7.1 | | 7.6 | |
| 20 | 8 days | 230–238 | −51.6° (c. 1.0 Di) | | | 64.6 | 7.0 | | 7.1 | | $C_{28}H_{36}ClSiFO_5$ | 64.3 | 6.9 | | 7.6 | |
| 21 | 10 days | 232–234 (K) | +48.7° (c. 1.0 Di) | 237 | 15,300 | 64.5 | 6.8 | | 7.2 | | $C_{28}H_{34}ClSiFO_5$ | 64.9 | 7.1 | | 7.4 | |

TABLE II—Continued

| Example number | Reaction time | M.P. (° C.) | [α]D | U.V. spectrum λ max, n.m. | ε | Found percent C | H | F | Cl | Br | I | Analysis, percent | Requires C | H | F | Cl | Br | I |
|---|---|---|---|---|---|---|---|---|---|---|---|---|---|---|---|---|---|---|
| 22 | 3 days | 257-259 | | | | | | | | | | | | | | | | |
| 23 | 11 days | 241-243 (K) | -63.6° (c. 0.35 Di) | 237 | 16,200 | 64.2 | 6.1 | | 7.7 | | | | 63.9 | 6.3 | | 7.9 | | |
| 24 | 4 days | 210-213 | -63° (c. 1.0 DMSO) | 237 | 16,900 | 64.3 | 6.55 | | 7.7 | | | | 64.6 | 6.5 | | 7.6 | | |
| 25 | 2-5 days | 90-100 | +133.2° (c. 1.04 Di) | 234 | 15,400 | | | | | | | $C_{23}H_{30}ClFO_5$ | | | | | | |
| 26 | 3 days | 210-212 (K) | +112.7° (c. 0.96 Di) | 238 | 15,400 | 58.1 | 6.1 | | | 15.9 | | $C_{24}H_{30}BrFO_5$ | 57.9 | 6.1 | | | 16.1 | |
| 27 | 40 hours | 204.5-206 (K) | +107.9° (c. 1.05 Di) | 238 | 15,330 | 59.2 | 6.0 | | | 15.6 | | $C_{24}H_{30}BrFO_5$ | 58.75 | 6.3 | | | 15.6 | |
| 28 | 2 days | 184-186 (K) | +99.3° (c. 1.19 Di) | 238 | 15,600 | 59.5 | 6.6 | | | 14.8 | | $C_{24}H_{30}BrFO_5$ | 59.4 | 6.5 | | | 15.2 | |
| 29 | 3 days | 182-185 (K) | +104.2° (c. 0.94 Di) | 237 | 16,100 | 59.0 | 6.6 | | | 15.1 | | $C_{24}H_{30}BrFO_5$ | 59.4 | 5.9 | | | 15.2 | |
| 30 | 2 days | 214-216 decomp. | +137.1° (c. 1.04 Di) | 236 | 16,100 | 56.5 | 6.1 | Total halogen 22.2 | | | | $C_{24}H_{30}BrClO_5$ | 56.1 | 6.5 | Total halogen 22.45 | | | |
| 31 | 5.5 days | 222-224 decomp. (K) | +59.8° (c. 1.0 Di) | | | 59.0 | 6.3 | | | 14.5 | | $C_{24}H_{31}BrFO_5$ | 59.4 | 6.5 | | | 15.2 | |
| 32 | 2 days | 232-237 decomp. (K) | +66.1° (c. 1.0 Di) | 237 | 16,100 | 59.65 | 6.5 | | | 14.8 | | $C_{24}H_{31}BrFO_5$ | 59.4 | 6.5 | | | 15.2 | |
| 33 | 18 hours | 225.5-227 decomp. | +109.8° (c. 1.02 Py) | 236 | 16,400 | 58.4 | 6.6 | | | 15.2 | | $C_{24}H_{31}BrFO_5$ | 58.7 | 5.9 | | | 15.6 | |
| 34 | 3 days | 237-239 | -36.4° (c. 0.88 Di) | 236 | 16,600 | 58.3 | 6.3 | | | 15.5 | | $C_{24}H_{31}BrFO_5$ | 58.9 | 5.9 | | | 15.7 | |
| 35 | 23 hours | 218-225 (K) | -41° (c. 1.03 DMSO) | 236 | 16,300 | 58.3 | 5.4 | | | 16.0 | | $C_{24}H_{31}BrFO_5$ | 58.2 | 5.7 | | | 16.1 | |
| 36 | 6 days | 168-169 decomp. (K) | +116.3° (c. 0.98 Di) | 238 | 15,700 | 53.7 | 5.52 | | | | 22.6 | $C_{24}H_{31}FIO_5$ | 53.8 | 6.0 | | | | 22.7 |
| 37 | 13 days | 161-163 (K) | +113.1° (c. 0.97 Di) | 238 | 16,300 | 54.5 | 5.8 | | | | 22.3 | $C_{24}H_{31}FIO_5$ | 54.55 | 5.7 | | | | 22.7 |
| 38 | 2 hours | 239 | +108° (c. 0.8 Di) | 239 | 15,700 | 66.2 | 7.1 | 9.25 | | | | $C_{26}H_{36}F_2O_5$ | 66.25 | 7.1 | 9.5 | | | |
| 40 | 9 days | 258-259 (K) | | | | 67.1 | 7.3 | | | | | $C_{26}H_{34}F_2O_5$ | 67.2 | 7.4 | | | | |
| 41 | 1 day | 246-248 (K) | | | | 66.8 | 6.9 | | | | | $C_{26}H_{34}F_2O_5$ | 67.2 | 7.0 | | | | |
| 47 | 7 days | 250-252 decomp. (K) | | 237.5 | 16,450 | 67.4 | 7.5 | | | | | $C_{27}H_{36}F_2O_5,\frac{1}{2}H_2O$ | 67.75 | 7.6 | | | | |
| 48 | 3 days | 233-236 decomp. (K) | | | | 63.2 | 6.7 | | | | | $C_{25}H_{33}F_2O_5$ | 63.6 | 6.7 | | | | |
| 49 | 56 hours | 212-214 decomp. | | | | 57.6 | 6.0 | | | | | $C_{24}H_{30}BrFO_5$ | 57.9 | 6.1 | | | | |
| 50 | 2 days | 195-197 (K) | +100.2° (c. 1.0 Di) | 237 | 17,000 | 53.2 | 5.6 | | | | 22.9 | $C_{24}H_{30}FIO_5$ | 52.95 | 5.55 | | | | 23.3 |
| 51 | 3 days | 168-171 decomp. | +124.0° (c. 1.0 Di) | | | | | | | | | | | | | | | |
| 52a | 2.5 hours | 162-165 decomp. | | | | | | | | | | | | | | | | |
| 52b | 4 hours | 236-244 (K) | | | | 66.1 | 6.5 | | | | | $C_{26}H_{33}F_2O_5$ | 66.35 | 6.5 | | | | |
| 53 | 2.75 hours | 234-238 decomp. (K) | +138.7° (c. 0.1 Di) | 236 | 15,400 | 58.1 | 5.6 | | 7.7 | | | $C_{24}H_{28}BrFO_5$ | 58.2 | 5.7 | | 7.8 | 16.1 | |
| 54 | 5 days | 202-205 decomp. (K) | +93.4° (c. 1.0 Py) | 237 | 16,600 | 64.0 | 7.15 | | | | | $C_{25}H_{33}ClFO_5$ | 63.6 | 6.7 | | | | |
| 57 | 21 hours | 216-222 decomp. (K) | +81.6° (c. 1.0 Di) | 238 | 14,400 | 53.6 | 5.8 | | | | 22.55 | $C_{25}H_{33}FIO_5$ | 53.8 | 5.8 | | | | 23 |
| 58a | 44 hours | Softens ~230 (K) | +78.0° (c. 1.0 Di) | 237 | 15,800 | | | | | | | | | | | | | |
| 58b | 48 hours | 208-212 decomp. (K) | +128.7° (c. 1.0 Di) | 237 | 15,700 | 57.2 | 6.1 | Total halogen 21.6 | | | | $C_{24}H_{31}ClO_5$ | 56.9 | 6.1 | Total halogen 21.9 | | | |
| 59 | 17 days | 170-176 decomp. (K) | +138.1° (c. 0.9 Di) | 239 | 15,800 | 51.75 | 5.4 | Total halogen 28.55 | | | | $C_{24}H_{30}ClO_5$ | 51.4 | 5.4 | Total halogen 22.6 28.95 | | | |
| 63 | 27 days | 217-221 (K) | -58.6° (c. 1.0 DMSO) | 237 | 17,450 | 64.9 | 6.9 | | 7.4 | | | $C_{24}H_{31}ClFO_5$ | 65.2 | 6.7 | | 7.4 | | |
| 64 | 40 hours | 228-231 decomp. (K) | -38.1° (c. 1.0 DMSO) | 237 | 16,600 | 60.0 | 6.2 | | | | | $C_{25}H_{33}BrFO_5$ | 59.7 | 6.2 | | | 15.3 | |
| 65 | 1 day | 154-157 decomp. | -14.2° (c. 1.0 DMSO) | 238 | 16,600 | 54.7 | 5.6 | | | 15.0 | | $C_{26}H_{33}F_2IO_5$ | 54.7 | 5.65 | | | | 22.25 |
| 68 | 8 days | 220-222 (K) | -50.3° (c. 1.0 DMSO) | 238 | 15,300 | 65.6 | 6.8 | | | | 21.9 | $C_{26}H_{33}ClFO_5$ | 65.2 | 6.7 | | 7.4 | | |
| 69 | 67 hours | Softens 180-190 (K) | -35.4° (c. 0.95 DMSO) | 238 | 16,000 | 59.7 | 6.2 | | | | | $C_{26}H_{33}BrFO_5$ | 59.7 | 6.2 | | | 15.2 | |
| 70 | 24 hours | 138-139.5 (K) | -12.6° (c. 1.05 DMSO) | 236-237 | 16,400 | 55.0 | 5.75 | | | 15.3 | 21.9 | $C_{26}H_{33}F_2IO_5$ | 54.7 | 5.65 | | | | 22.25 |
| 71 | 5 hours | | -18.6° (c. 1.0 DMSO) | 237-238 | 17,500 | 53.4 | 5.2 | | | | 23.0 | $C_{26}H_{33}ClO_5$ | 53.15 | 5.2 | | 7.6 | | 23.4 |
| 72 | 3 hours | | | 234 | | | | | | | | | | | | | | |
| 74 | 5.5 hours | 252-253 decomp. (K) | -107° (c. 1.0 DMSO) | 237 | 16,300 | 66.6 | 6.2 | | | | | $C_{26}H_{34}F_2O_5$ | 66.3 | 6.5 | | | | |
| 75 | do. | 219-221 (K) | -94° (c. 1.0 DMSO) | 237 | 16,500 | 67.25 | 6.6 | | | | | $C_{26}H_{34}F_2O_5$ | 67.5 | 7.0 | | | | |
| 76 | 4.8 hours | 189-191 (K) | -91° (c. 0.5 DMSO) | 235-236 | 16,000 | 67.1 | 7.0 | | | | | $C_{26}H_{34}F_2O_5$ | 67.5 | 7.0 | | | | |
| 77 | 70 mins | 231-235 (K) | -62° (c. 0.5 DMSO) | 235 | 16,200 | | | | | | | | | | | | | |
| 78 | 80 mins | 146-148 (K) | -59.5° (c. 0.5 DMSO) | | | | | | | | | | | | | | | |
| 79 | 5 hours | 112-119 (K) | | | | | | | | | | | | | | | | |
| 81 | 26 hours | 198-202 (K) | | 237-238 | 17,000 | 63.75 | 7.3 | | | 7.5 | | $C_{25}H_{34}ClFO_5$ | 64.0 | 7.3 | | 7.55 | | |
| 82 | do | 194-198 decomp. (K) | | 237 | 16,400 | 58.6 | 6.7 | | | 15.0 | | $C_{25}H_{34}BrFO_5$ | 58.5 | 6.7 | | | 15.55 | |

The following Examples (a) to (m) illustrate topical formulations prepared in accordnce with this invention. In these examples the active ingredient may be any of the active steroids hereinbefore disclosed e.g. a compound according to Table I.

The following Examples (a)-(d) illustrate the preparation of ointments.

Example (a)

| | Percent w./w. |
|---|---|
| Active ingredient | 0.1 |
| Liquid paraffin B.P. | 10.0 |
| White soft paraffin to produce 100 parts by weight. | |

Ball-mill the steroid with a little of the liquid paraffin until the particle size is reduced to 95% by number below 5μ. Dilute the paste and rinse out the mill with the remaining liquid paraffin, mix and add the suspension to the melted white soft paraffin at 50° C. Stir until cold to give a homogeneous ointment.

Example (b)

| | Percent w./w. |
|---|---|
| Active ingredient | 0.25 |
| Aluminium stearate | 3.2 |
| Liquid paraffin B.P. to 100 parts. | |

Disperse the aluminium stearate in the liquid paraffin by vortex stirring and heat the suspension with continued stirring, at a temperature rise rate of 20° C. per minute until 90° C. is reached. Maintain the temperature at 90–95° C. for 30 minutes until solution is complete and a gel is formed. Cool quickly, preferably by the use of cooling coils or concentric cooling rings to produce a transparent solid gel. Mill the active ingredient to produce microfine particles of which not less than 90% by number are below 5µ. Triturate with a small portion of the gel and incorporate the remaining gel to give a homogeneous mix.

Example (c)

| | Percent w./w. |
|---|---|
| Active ingredient | 0.1 |
| Woolfat | 12.0 |
| Cetostearyl alcohol B.P.C. | 20.0 |
| Liquid paraffin B.P. | 25.0 |
| White soft paraffin to 100 parts w./w. | |

Ball-mill the steroid with a little of the liquid paraffin as in Example (a) and add the resulting paste, diluted with the remaining liquid paraffin, to a mixture of cetostearyl alcohol, woolfat and white soft paraffin, melted together by gentle warming. Stir until cold to give a homogeneous mix.

Example (d)

| | Percent w./w. |
|---|---|
| Active ingredient | 0.05 |
| Hydrogenated lanolin e.g. Lanocerina sold by Croda Ltd. of London, W.C·2. England | 20.0 |
| Liquid paraffin B.P. | 15.0 |
| White soft paraffin to 100 parts w./w. | |

Ball-mill the steroid with liquid paraffin as in Example (a), and add the resulting paste, diluted with the remaining liquid paraffin to the mixture of hydrogenated lanolin and white soft paraffin, melted together by gently warming. Stir until cold to give a homogeneous mix.

The following Examples (e) and (f) illustrate the preparation of water-miscible creams:

Example (e)

| | Percent w./w. |
|---|---|
| Active ingredient | 0.1 |
| Beeswax (White) | 15.0 |
| Cetostearyl alcohol B.P.C. | 7.0 |
| Cetomacrogel 1000 B.P.C. | 3.0 |
| Liquid paraffin B.P. | 5.0 |
| Chlorocresol | 0.1 |
| Distilled water to produce 100 parts by weight. | |

Ball-mill the steroid with a little liquid paraffin as described in Example (a). Heat the available water to 100° C., add the chlorocresol, stir to dissolve and cool to 65° C. Melt together the beeswax, cetostearyl alcohol and cetomacrogel and maintain at 65° C. Add the steroid suspension using the remaining liquid paraffin for rinsing. Add the steroid oily phase at 60° C. to the chlorocresol aqueous phase at 65° C. and stir rapidly while the emulsion cools over the gelling point (40–45° C.). Continue to stir at slow speed until the cream sets.

Example (f)

| | Percent w./w. |
|---|---|
| Active ingredient | 0.1 |
| Cetostearyl alcohol B.P.C. | 7.2 |
| Cetomacrogel 1000 B.P.C. | 1.8 |
| Liquid paraffin B.P. | 6.0 |
| White soft paraffin | 15.0 |
| Chlorocresol | 0.1 |
| Distilled water to produce 100 parts by weight. | |

Prepare as described in Example (e), replacing the beeswax with white soft paraffin in the oily phase.

The following Examples (g) and (h) illustrate the preparation of lotions:

Example (g)

| | Percent w./v. |
|---|---|
| Active ingredient | 0.25 |
| Lanbritol wax [1] | 0.93 |
| Diethylene glycol monostearate | 0.65 |
| Cetostearyl alcohol B.P.C. | 0.65 |
| Liquid paraffin B.P. | 1.95 |
| Glycerin | 5.0 |
| Isopropyl alcohol | 6.5 |
| Methyl p-hydroxy benzoate | 0.15 |
| Distilled water to produce 100 volumes. | |

[1] Lanbritol wax is a non-ionic wax for stabilizing emulsions consisting of a mixture of fatty alcohols with polyethylene glycol ethers of fatty alcohols sold by Ronsheim Moore of London W.C. 1, England.

Ball-mill the steroid with half the glycerin, as in Example (a), and use the isopropyl alcohol for dilution and rinsing purposes.

Melt together the lanbritol wax, diethylene glycol monostearate, cetostearyl alcohol and liquid paraffin and maintain at 60° C. Heat the available water and remaining glycerin to 95° C. Add the methyl parahydroxy benzoate and stir until dissolved. Cool to 65° C. Add the oily mix at 60° C. to the aqueous phase at 65° C. and allow to cool while stirring rapidly until the emulsion gels at 40–45° C., thereafter stir slowly. Add the well mixed steroid suspension slowly to the lotion base and stir to obtain a homogeneous mix.

Example (h)

| | w./v. percent |
|---|---|
| Active ingredient | 0.05 |
| Tween 80 (polyoxyethylene sorbitan monooleate) | 0.01 |
| oleate) | 0.01 |
| Carbopol 934 (carboxy vinyl polymers) | 0.3 |
| Diethanolamine | [1] 0.5 |
| Distilled water to produce 100 vols. | |

[1] (Approx.)

Ball-mill the steroid with a little water and the Tween 80 as in Example (a). Disperse the Carbopol 934 in the available water by vortex stirring. Add the diethanolamine slowly with stirring until the clear thickened mix has a pH of 7.0. Incorporate the steroid slurry into the lotion base and mix well.

Example (i)

Aerosol spray lotion:

| | | |
|---|---|---|
| Active ingredient (microfine) | mgm | 2.5 |
| Fractionated coconut oil to | g | 1.20 |
| Dichlorodifluoromethane | g | 16.32 |
| Trichlorofluoromethane | g | 24.48 |

Dry the steroid overnight at 60° C. under vacuum and over phosphorus pentoxide. Ball-mill the dried powder for at least 4 hours with a little of the dried filtered oil. Rinse out the mill with more dried filtered oil and pass the suspension through a 325 mesh B.S. sieve. Assay the suspension and dilute with more dried filtered oil to the required concentration. Incorporate the suspension into the pressure container with the propellants in a conventional manner.

Example (j)

Aphthous ulcer pellets:

| | Mg. |
|---|---|
| Active ingredient (microfine) | 0.25 |
| Lactose | 69.90 |
| Acacia | 3.00 |
| Magnesium stearate | 0.75 |

Pass the steroid, lactose and acacia, separately through a No. 60 B.S. mesh sieve. Blend the powders and granulate with 50% ethanol in water. Pass the mass through a No. 12 mesh B.S. sieve and dry the granules at 50° C. Pass the dried granules through a No. 20 mesh B.S. sieve and blend in the megnesium stearate, previously passed through a No. 100 mesh B.S. sieve. Compress in a conventional manner on 7/32 inch diameter punches, to give a pellet that will dissolve solwly in the mouth.

Example (k)

Retention enema: w./v. percent
- Active ingredient (microfine) — 0.0005
- Tween 80 — 0.05
- Ethanol — 0.015
- Methyl p-hydroxy benzoate — 0.08
- Propyl p-hydroxy benzoate — 0.02
- Distilled water to 100 vols.

Heat the available water to 95° C., add the methyl and propyl p-hydroxy benzoates and stir to dissolve. Cool the vehicle to room temperature. Disperse the steroid in the ethanol and add to the Tween 80; warm the mixture to 50° C. and stir until the steroid is in solution. Add the steroid solution to the vehicle, stirring vigorously to avoid precipitation, and make up to volume with water if required. Distribute the enema into plastic bags e.g. P.V.C. bags for self-administration or into other containers suitable for use.

Example (l)

Eye drops: w./v. percent
- Active ingredient — 0.025
- Tween 80 — 2.5
- Ethanol — 0.75
- Benzalkonium chloride — 0.02
- Phenyl ethanol — 0.25
- Sodium chloride — 0.60
- Water for injection to 100 vols.

Dissolve the sodium chloride, benzalkonium chloride and phenyl ethanol in the water for injection. Suspend the steroid in the alcohol and add to the Tween 80. Warm the mixture to 50° C. and still until dissolved. Add the steroid solution to the eye-drop vehicle with rapid stirring to obtain a clear solution. Sterilise the bulk by filtration through a sintered glass filter and distribute into sterile small well filled, neutral glass eye-drop containers.

Example (m)

Nasal drops: w./v. percent
- Active ingredient — 0.005
- Tween 80 — 0.05
- Alcohol 95% — 0.15
- Methyl paraben (p-hydroxy benzoate) — 0.04
- Propyl paraben (p-hydroxy benzoate) — 0.02
- Sodium chloride — 0.70
- Distilled water to 100 vols.

Dissolve the sodium chloride and the parabens in the distilled water heated to 95° C., and allow the solution to cool. Disperse the steroid in the alcohol and add to the Tween 80. Warm the mixture to 50° C. and stir until solution of the steroid is effected. Add the steroid solution to the vehicle with rapid stirring to obtain a clear solution. Filter the solution free from particulate matter through a sintered glass filter and distribute into small, well filled containers.

The following Examples (n) and (o) illustrate formulations for internal administration according to the invention. In both examples the active ingredient used may be any of the active steroid hereinbefore disclosed, e.g. a compound according to Table I.

Example (n)

(Oral Tablet): Mg.
- Active ingredient — 0.5
- Lactose — 175.5
- Maize starch (dried) — 20.0
- Gelatin — 2.0
- Magnesium stearate — 2.0

Total weight — 200.0

A suspension of 300 mg. of the active ingredient in 2 ml. of water containing 0.1% of Tween 80 was milled for 16 hours in a 10 ml. nylon pot about three quarters filled with steatite balls, until 90% by number of the particles had a diameter of less than 10 microns. The maize starch and lactose were blended and passed through a 60 mesh B.S. sieve and granulated with a 10% solution of gelatin, containing the suspension of the active ingredient and washings from the nylon pot, by passing through a 16 mesh B.S. sieve. The granules were dried at 40° C. overnight, passed through a 20 mesh B.S. sieve and blended with magnesium stearate and tabletted using a tabletting machine having a 5/32 inch flat-bevelled punch.

Example (o)

Intra-articular injection (a) Preparation of small particle active ingredient. 2.8 g. Tween 80 was dissolved in 130 ml. of dimethyl acetamide (DMA). 12 g. of the active ingredient was then dissolved in 130 ml. of this solution and the resulting solution was filtered successively through two dry sintered glass filters (No. 3 and No. 4).

The solution of active ingredient was then added, under aseptic conditions, in a fine stream to a stirred sterile aqueous solution of benzyl alcohol (10 g. in 1 litre water) over a period of ten minutes. The preparation was allowed to stand for at least three hours and the resulting crystals collected by filtration or centrifuging. The preparation was washed with aqueous benzyl alcohol (10 g. in 1 litre water) and the wet-cake transferred to a well-sealed container. 90% by number of the particles had a diameter less than $10\mu$ and none were above $50\mu$ in diameter.

(b) Production of Injectable Preparation

Composition: Percent w./v.
- Fine particle ingredient prepared as in (a) — 0.50
- Hydroxyethyl cellulose — 0.40
- Benzyl alcohol — 1.00
- Sodium citrate — 0.30
- Sodium salt of EDTA[1] — 0.01
- Sodium chloride — 0.44
- Citric acid — q.s.
- Water for injection to 100.0.
- pH value 4.80 to 5.50

[1] EDTA is ethylene diamine tetracetic acid.

(1) Vehicle.—The hydroxyethyl cellulose was dissolved in 17.5 litres of water for injection using a high speed vortex stirrer. The benzyl alcohol was added with stirring. The sodium chloride, sodium citrate and sodium salt of EDTA were dissolved in 1 litre of water and added to the bulk vehicle with stirring. The pH value of the bulk vehicle was adjusted to 4.80 to 5.50 with a solution of citric acid. The volume was then adjusted to 19.3 litres and the vehicle clarified by filtration through nylon. The vehicle was finally sterilised by autoclaving.

(2) Sterile wet-cake of small particle active ingredient prepared as in (a) containing 100 g. of the active ingredient was added with stirring and under aseptic conditions to 19 litres of the vehicle, and the volume made up to 20 litres. The resulting suspension was passed through a sterile 100 mesh British Standard sieve and stored in a sealed container. Dosage units for injection were prepared by aseptically filling neutral glass ampoules or vials closed by a pure latex plug.

We claim:
1. A compound of the formula

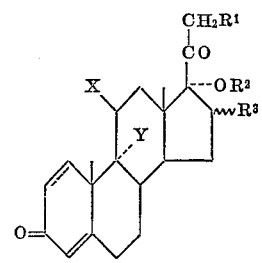

wherein

━━━ represents a single or double bond between the 1- and 2- positions and wherein
  (a) X is a hydroxy group in the β-configuration,
    $R^1$ is a fluorine, chlorine, bromine or iodine atom,
    $R^2$ is an alkanoyl group containing 2–4 carbon atoms,
    $R^3$ is a methyl group or a methylene group, and
    Y is a fluorine atom when
    $R^2$ is an alkanoyl group containing 2–4 carbon atoms or when
    $R^2$ is an alkanoyl group containing 2 or 3 carbon atoms, a chlorine atom; or
  (b) X is a keto group,
    $R^1$ is a fluorine, chlorine or iodine atom,
    $R^2$ is an alkanoyl group containing 2–4 carbon atoms,
    $R^3$ is a β-methyl group when $R^1$ is a fluorine, chlorine or iodine atom, or when $R^1$ is a fluorine atom, a methylene or α-methyl group, or when $R^1$ is an iodine atom, an α-methyl group, and
    Y is a fluorine atom, 2. A compound as defined in claim 1 in which

━━━ represents a double bond.

3. A compound as defined in claim 2 in which $R^3$ is methyl, Y is a fluorine atom and X is a hydroxy group in the β-configuration.

4. A compound as defined in claim 2 in which $R^3$ is a β-methyl group and X is a keto group.

5. A compound as defined in claim 1 in which $R^1$ is a chlorine or fluorine atom.

6. A compound as defined in claim 1 in which said compound is 17-butyryloxy-9α,21-difluoro-11β-hydroxy-16β-methyl-pregna-1,4-diene-3,20-dione.

7. A compound as defined in claim 1 in which said compound is 21-chloro-9α-fluoro-11β-hydroxy-16β-methyl-17-propionyloxypregna-1,4-diene-3,20-dione.

8. A compound as defined in claim 1 in which said compound is 17-butyryloxy-21-chloro-9α-fluoro-11β-hydroxy-16β-methylpregna-1,4-diene-3,20-dione.

9. A compound as defined in claim 1 in which said compound is 9α-fluoro-11β-hydroxy-21-iodo-16β-methyl-17-propionyloxypregna-1,4-diene-3,20-dione.

10. A compound as defined in claim 1 in which said compound is 21-chloro-9α-fluoro-11β-hydroxy-16α-methyl-17-propionyloxypregna-1,4-diene-3,20-dione.

11. A compound as defined in claim 1 in which said compound is 17 - acetoxy - 21 - bromo-9α-chloro-11β-hydroxy-16β-methylpregna-1,4-diene-3,20-dione.

12. A compound as defined in claim 1 in which said compound is 17-acetoxy - 9α - 21-difluoro - 16β - methylpregna-1,4-diene-3,11,20-trione.

13. A compound as defined in claim 1 in which said compound is 21-chloro-9α-fluoro-16β-methyl-17-propionyloxypregna-1,4-diene-3,11,20-trione.

14. A compound as defined in claim 1 in which said compound is 17 - butyryloxy - 21 - chloro-9α-fluoro-16β-methylpregna-1,4-diene-3,11,20-trione.

15. A compound as defined in claim 1 in which said compound is 17-acetoxy-21-bromo-9α-fluoro-16β-methyl-pregna-1,4-diene-3,11,20-trione.

16. A compound as defined in claim 1 in which said compound is 17 - acetoxy - 21 - chloro-9α-fluoro-11β-hydroxy-16-methylenepregna-1,4-diene-3,20-dione.

17. A compound as defined in claim 1 in which said compound is 21-chloro-9α-fluoro-11β-hydroxy-16-methylene-17-propionyloxypregna-1,4-diene-3,20-dione.

18. A compound as defined in claim 1 in which said compound is 9α-fluoro-11β-hydroxy-21-iodo-17-isobutyryloxy-16-methylenepregna-1,4-diene-3,20-dione.

19. A compound as defined in claim 1 in which said compound is 21-chloro-9α-fluoro-11β-hydroxy-16β-methyl-17-propionyloxypregna-4-ene-3,20-dione.

20. A compound as defined in claim 1 in which said compound is 21-bromo-9α-fluoro-11β-hydroxy-16β-methyl-17-propionyloxypregna-4-ene-3,20-dione.

21. A compound as defined in claim 1 in which said compound is 9α,21 - difluoro-11β-hydroxy-16-methylene-17-propionyloxypregna-1,4-diene-3,20-dione.

22. A compound as defined in claim 1 in which said compound is 9α,21 - difluoro-16-methylene-17-propionyloxypregna-1,4-diene-3,11,20-trione.

23. A compound selected from the group consisting of
17-acetoxy-9α,21-difluoro-11β-hydroxy-16β-methyl-pregna-1,4-diene-3,20-dione;
9α,21-difluoro-11β-hydroxy-16β-methyl-17-propionyloxy-pregna-1,4-diene-3,20-dione;
9α,21-difluoro-11β-hydroxy-17-isobutyryloxy-16β-methyl-pregna-1,4-diene-3,20-dione;
9α,21-difluoro-11β-hydroxy-16β-methyl-17-valeryloxy-pregna-1,4-diene-3,20-dione;
17-acetoxy-21-chloro-9α-fluoro-11β-hydroxy-16β-methyl-pregna-1,4-diene-3,20-dione;
21-chloro-9α-fluoro-11β-hydroxy-17-isobutyryloxy-16β-methylpregna-1,4-diene-3,20-dione;
17-acetoxy-21-bromo-9α-fluoro-11β-hydroxy-16β-methylpregna-1,4-diene-3,20-dione;
21-bromo-9α-fluoro-11β-hydroxy-16β-methyl-17-propionyloxypregna-1,4-diene-3,20-dione;
17-acetoxy-9α-fluoro-11β-hydroxy-21-iodo-16β-methyl-pregna-1,4-diene-3,20-dione;
17-butyryloxy-21-chloro-9α-fluoro-11β-hydroxy-16α-methylpregna-1,4-diene-3,20-dione;
21-chloro-9α-fluoro-11β-hydroxy-17-isobutyryloxy-16α-methylpregna-1,4-diene-3,20-dione;
21-bromo-9α-fluoro-11β-hydroxy-16α-methyl-17-propionyloxypregna-1,4-diene-3,20-dione;
21-bromo-17-butyryloxy-9α-fluoro-11β-hydroxy-16α-methylpregna-1,4-diene-3,20-dione;
17-acetoxy-9α,21-dichloro-11β-hydroxy-16β-methyl-pregna-1,4-diene-3,20-dione;
9α,21-dichloro-11β-hydroxy-16β-methyl-17-propionyloxypregna-1,4-diene-3,20-dione;
21-bromo-9α-chloro-11β-hydroxy-16β-methyl-17-propionyloxypregna-1,4-diene-3,20-dione;
17-butyryloxy-21-chloro-9α-fluoro-11β-hydroxy-16-methylenepregna-1,4-diene-3,20-dione;
21-chloro-9α-fluoro-11β-hydroxy-17-isobutyryloxy-16-methylenepregna-1,4-diene-3,20-dione;
17-acetoxy-21-bromo-9α-fluoro-11β-hydroxy-16-methylenepregna-1,4-diene-3,20-dione;
21-bromo-9α-fluoro-11β-hydroxy-16-methylene-17-propionyloxypregna-1,4-diene-3,20-dione;
21-bromo-17-butyrlyloxy-9α-fluoro-11β-hydroxy-16-methylenepregna-1,4-diene-3,20-dione;
17-acetoxy-9α-fluoro-11β-hydroxy-21-iodo-16-methylenepregna-1,4-diene-3,20-dione;
17-butyryloxy-9α-fluoro-11β-hydroxy-21-iodo-16-methylenepregna-1,4-diene-3,20-dione;
9α-fluoro-11β-hydroxy-21-iodo-16α-methyl-17-propionyloxy-pregna-1,4-diene-3,20-dione;
17-acetoxy-9α,21-difluoro-11β-hydroxy-16-methylene-pregna-1,4-diene-3,20-dione;
17-butyryloxy-9α,21-difluoro-11β-hydroxy-16-methylene-pregna-1,4-diene-3,20-dione;
17-acetoxy-21-chloro-9α-fluoro-11β-hydroxy-16α-methyl-pregna-1,4-diene-3,20-dione;
21-bromo-9α-fluoro-11β-hydroxy-17-isobutyryloxy-16α-methyl-pregna-1,4-diene-3,20-dione;
21-bromo-9α-fluoro-16β-methyl-17-propionyloxypregna-1,4-diene-3,11,20-trione;

21-bromo-9α-fluoro-11β-hydroxy-17-isobutyryloxy-16-methylenepregna-1,4-diene-3,20-dione;

9α,21-difluoro-11β-hydroxy-17-isobutyryloxy-16-methylenepregna-1,4-diene-3,20-dione; and 17-butyryloxy-9α,21-difluoro-16-methylenepregna-1,4-diene-3,11,20-trione.

24. 17-butyryloxy - 21 - chloro - 9α - fluoro - 16α-methylpregna-1,4-diene-3,11,20-trione.

References Cited
UNITED STATES PATENTS 3,375,261  3/1968  Arth et al. _____ 260—397.45

ELBERT L. ROBERTS, Primary Examiner

U.S. Cl. X.R.

424—243

UNITED STATES PATENT AND TRADEMARK OFFICE

CERTIFICATE EXTENDING PATENT TERM
UNDER 35 U.S.C. 156

Patent No.    : 3,721,687

Dated         : March 20, 1973

Inventor(s)   : Joseph Elks, et al

Patent Owner  : Glaxo Operations
                UK Limited

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Nineteenth day of December 1986.

Donald J. Quigg

Assistant Secretary and Commissioner of Patents and Trademarks